US008417574B2

(12) United States Patent
Chalmers et al.

(10) Patent No.: US 8,417,574 B2
(45) Date of Patent: Apr. 9, 2013

(54) SYSTEM AND METHOD FOR INITIATING RETURNS OVER A NETWORK

(75) Inventors: Geoff S. Chalmers, Atlanta, GA (US); Thomas V. Hoffmann, Atlanta, GA (US)

(73) Assignee: United Parcel Service of America, Inc.

( * ) Notice: Subject to any disclaimer, the term of this patent is extended or adjusted under 35 U.S.C. 154(b) by 1266 days.

(21) Appl. No.: 12/195,662

(22) Filed: Aug. 21, 2008

(65) Prior Publication Data

US 2008/0306758 A1 Dec. 11, 2008

Related U.S. Application Data

(62) Division of application No. 11/828,864, filed on Jul. 26, 2007, now Pat. No. 7,430,527, which is a division of application No. 10/098,634, filed on Mar. 13, 2002, now Pat. No. 7,266, 513.

(60) Provisional application No. 60/275,861, filed on Mar. 14, 2001.

(51) Int. Cl.
*G06Q 30/00* (2012.01)

(52) U.S. Cl. .................................... 705/26.1; 705/27.1

(58) Field of Classification Search .................... 705/26, 705/27, 26.1, 27.1
See application file for complete search history.

(56) References Cited

U.S. PATENT DOCUMENTS

| | | | |
|---|---|---|---|
| 5,153,842 | A | 10/1992 | Dlugos, Sr. et al. |
| 5,375,240 | A | 12/1994 | Grundy |
| 5,631,827 | A | 5/1997 | Nicholls |
| 6,047,264 | A | 4/2000 | Fisher et al. |
| 6,208,980 | B1 | 3/2001 | Kara |
| 6,220,509 | B1 | 4/2001 | Byford |
| 6,236,972 | B1 | 5/2001 | Shkedy |
| 6,285,916 | B1 | 9/2001 | Kadaba et al. |
| 6,343,275 | B1 | 1/2002 | Wong |
| 6,356,196 | B1 | 3/2002 | Wong et al. |
| 6,463,420 | B1 | 10/2002 | Guidice et al. |
| 6,536,659 | B1 | 3/2003 | Hauser et al. |
| 6,598,091 | B1 | 7/2003 | Yoo et al. |
| 7,177,825 | B1 | 2/2007 | Borders et al. |
| 2002/0010634 | A1 | 1/2002 | Roman et al. |

(Continued)

FOREIGN PATENT DOCUMENTS

| | | |
|---|---|---|
| CN | 1250914 | 4/2000 |
| EP | 0585932 | 9/1994 |

(Continued)

OTHER PUBLICATIONS

Davenport, Sally, FedEx sets new strategic direction with on-line ordering, Business Wire [New York] Oct. 9, 1996, downloaded from ProQuestDirect on the Internet on Nov. 27, 2012, 4 pages.*

(Continued)

*Primary Examiner* — James Zurita
(74) *Attorney, Agent, or Firm* — Alston & Bird LLP

(57) ABSTRACT

The present invention provides systems and methods for processing return transactions over a network. An embodiment of the invention discloses an online return application that generates an electronic return shipping label that can be delivered to a browser of a customer that wishes to make a return. Also, disclosed is the creation and transmission of label delivery links, which provide for dynamic generation and delivery of shipping labels.

17 Claims, 18 Drawing Sheets

U.S. PATENT DOCUMENTS

| | | | | |
|---|---|---|---|---|
| 2002/0013744 | A1* | 1/2002 | Tsunenari et al. | 705/28 |
| 2002/0016726 | A1 | 2/2002 | Ross | |
| 2002/0019761 | A1 | 2/2002 | Lidow | |
| 2002/0019777 | A1* | 2/2002 | Schwab et al. | 705/26 |
| 2002/0032612 | A1 | 3/2002 | Williams et al. | |
| 2002/0073039 | A1 | 6/2002 | Ogg et al. | |

FOREIGN PATENT DOCUMENTS

| | | | |
|---|---|---|---|
| EP | 0969389 | A2 | 1/2000 |
| JP | 10-207956 | | 8/1998 |
| JP | 11-1395-40 | | 5/1999 |
| JP | 2000-339373 | | 12/2000 |
| JP | 2001-022678 | | 1/2001 |
| JP | 2001315916 | | 11/2001 |
| WO | WO 9638800 | | 12/1996 |
| WO | WO 00/30014 | A1 | 5/2000 |
| WO | WO 0026842 | | 5/2000 |
| WO | WO 00/46726 | | 8/2000 |
| WO | WO 00/46728 | | 8/2000 |
| WO | WO 01/16889 | A1 | 3/2001 |
| WO | WO 01/29778 | A1 | 4/2001 |
| WO | WO 01/35344 | A2 | 5/2001 |
| WO | WO 01/65454 | A2 | 9/2001 |
| WO | WO 01/67344 | A1 | 9/2001 |
| WO | WO 01/72109 | A2 | 10/2001 |
| WO | WO 01/88831 | A2 | 11/2001 |
| WO | WO 02/07104 | A1 | 1/2002 |
| WO | WO 02/17045 | A2 | 2/2002 |
| WO | WO 02/052378 | A2 | 7/2002 |

OTHER PUBLICATIONS

UPS: Innovative web resource to promote wider understanding and adoption of E-commerce solutions, M2 Presswire [Coventry] May 28, 1998, downloaded from ProQuestDirect on the Internet on Nov. 27, 2012, 3 pages.*

Caminiti et al., United Parcel Service Introduces Advanced Label Imaging System, Nov. 29, 1989, Section 1, p. 1, 2 pages total, Retrieved Sep. 19, 2005 from Internet Site http://proquest.umi.com/pqdweb?index=0&did=6390966&SrchMode=1&sid=5&Fmt=3&VI . . . , Business Wire.

UPS, 10_098634_Screens_InitiatingReturns.doc, 5 pages, Downloaded from www.archive.org, Date Unknown, UPS.

International Search Report from PCT/US02/08048, dated Mar. 31, 2003.

Supplemental European Search Report from corresponding European Application No. 02725193.3, based on PCT/US/02/08048, dated Nov. 17, 2007.

Walker, A Promise of Ultimate Shopping Experience; Ottawa Citizen, Ottawa, Ont. Jul. 29, 1999, p. E3, downloaded from ProQuest Direct on the Internet on Jun. 18, 2008.

Powell, Guide to e-shopping for Office Supplies; Office solutions, Mt. Airy, Feb. 2000, vol. 17, issue 2, p. 26, downloaded from ProQuest Direct on the Internet on Jun. 18, 2008.

European Search Report for Application No. 10010016.3-2221 dated Dec. 15, 2010.

Harrington, Lisa, The U.S. Postal Service Gets Serious About Serving Business in the New Economy, Journal, May 2000, Downloaded from the Internet on Oct. 3, 2002, p. 2, vol. 41, No. 5, Accession No. 01167257, Penton Publishing, Inc., United States of America.

Henderson, Timothy, Buy.com Boosts Returns Process Efficiency With New Solution, Periodical, Nov. 2000, Downloaded from the Internet on Oct. 3, 2002, pp. 72-76, vol. 82n11, Accession No. 02102731, ProQuest Info&Learning, United States of America.

Business Wire, Many Happy Returns—UPS Unvels Advanced Outline Returns Solution, Journal, Sep. 20, 2000, Downloaded from the Internet on Oct. 3, 2002, Accession No. 12921102, Business Wire, United States of America.

De Marco, Donna, E-Tail Presents Can Be Tougher to Send Back Than Order, Journal, Dec. 28, 1999, Downloaded from the Internet on Oct. 3, 2002, Accession No. 08891512, Knight-Ridder/Tribune Business News, The Dialog Corporation, United States.

Brewin, Bob and Rosencrance, Linda, Follow That Package!, Article, Mar. 19, 2001 (Retrieved from the Internet Apr. 25, 2003), p. 1-p. 5, Retrieved from the Internet: URL:http://www.computerworld.com./printthis/2001/0,4814,58696,00.html, Computer World.

El Portal Del Transporte, FedEx Insight Empowers Customers with Enhanced Shipment Visibility and Control, Article, Apr. 11, 2001 (Retrieved on Apr. 25, 2003), p. 9, Paragraph 4—p. 10, Line 7, Retrieved from the Internet: <URL:http://www.transportando.net/newsabril_completa.htm>.

Frontline Solutions, FedEx Improves Internal, External Operations, Article, Apr. 5, 2001 (Retrieved from the Internet Apr. 25, 2003), p. 1 (last line) through p. 2, Paragraph 9, Retrieved from the Internet: <URL:http://www.frontlinemagazine.com/art_th/o4052001.htx>, Fairfax, Virginia and Memphis, Tennessee.

Pender, Lee, Hard Times Are the Best Times, Magazine, Aug. 15, 2001 (Retrieved on Apr. 25, 2003), p. 3, Paragraph 3, Retrieved from the Internet: <URL:http://www.cio.com/archive/081501/besttimes_content.html>.

Van Huzien, Gordon, Messaging: The Transport Part of The XML Puzzle, Article, Jul. 2000 (Retrieved from the Internet Apr. 25, 2003: <URL:http://www-106.ibm.com/developerworks/libray/xml-messaging/>.

Author Unknown, Outlook 2000 Handbook First Edition (relevant part); p. 95, last 9 lines; one page.

Rick Brooks, UPS Launches Package-Return Service for Web Purchases That Tracks Progress, Journal, Sep. 21, 2000, p. B4, The Wall Street Journal.

Canadian Intellectual Property Office, Examiner's Requisition for Canadian Application No. 2,440,661, dated Apr. 30, 2012, 4 pages, Canada.

* cited by examiner

```
<AccessRequest>                                          315        310
        <AccessLicenseNumber>5B532C247568B520<AccessLicenseNumber>
        <UserId>JohnQPublic</UserId>
        <Password>p@$$w*rd</Password>
</AccessRequest>                        320                          305
<ReturnRequest>
        <Request>
                <RequestAction>Return</RequestAction>
                <TransactionReference>
                        <CustomerContext/>
                <XpciVersion Version = "1.0002"/>
        </TransactionReference>
322  </Request>
<LabelSpecification>                              325
        >LabelPrintMethod>
                <Code>GIF</Code>                        330
        </LabelprintMethod>
        <LabelStockSize)
                <Height>8</Height
                <Width>4</Width>                                   332
        </LabelStockSize>
        <HTTPUserAgent>Mozilla/4.5</HTTPUserAgent>
        <LabelImageFormat>
                <Code>GIF</Code>                        335
        </LabelImageFormate>
337  </LabelSpecification>
<Shipment>                                        340
        <Shipper>
                <Name>Merchant</Name>
                <PhoneNumber>8005551212</PhoneNumber>
                <ShipperNumber>abc123</ShipperNumber>
                <Address>
                        <AddressLine1>11 Merchange Lane</AddressLine1>
                        <City>Atlanta</City>
                        <StateProvinceCode>GA</StateProvincecode>
                        >PostalCode>30188</PostalCode>
                        <Countrycode>US</CountryCode>
                </Address>
        </Shipper>                          345
        <ShipTo>
                <CompanyName>Vendor</CompanyName>
                <AttentionName>ContactName</AttentionName>
                <PhoneNumber>8009190000</PhoneNumber>
                <Address>
                        <AddressLine1>33 Vendor Lane</AddressLine1>
                        <City>Atlanta</City>
                        <StateProvinceCode>GA</StateProvinceCode>
                        <PostalCode>30018</PostalCode>
                        <PostalCode>US</CountryCode>
                </Address>
        </ShipTo>                             350
        <ShipFrom>
                <CompanyName>Jane Doe</CompanyName>
                <PoneNumber>5551414</PhoneNumber>
                <Address>
                        <AddressLine1>2001 Consumber Drive</AddressLine1>
                        <City>Atlanta</City>
                        <StateProvinceCode>GA</StateProvinceCode>
                        <PostalCode>30010</PostalCode?
                        <CountryCode>US/CountryCode?
                </Address>
        </ShipFrom>
```

Fig. 5A 351 305

```
<ReturnService>
        <Code>4</Code>
</ReturnService>
<Service>
        <Code>01</Code>
</Service>
<PaymentInformation>
        <Prepaid>
                <BillShipper>
                        <AccountNumber>123456</AccountNumber>
                </BillShipper>
        </Prepaid>
</PaymentInformation>
<Package>
        <PackageServiceOptions>
                <Notification>
                        <NotificationCode>3</NotificationCode?
                        <EMailMessage>
                                <EMailAddress>Vendor@vendor.com</EMailAddress>
                                <Memo/>
                                <Subject>Shipment ID</Subject>
                                <FromEMailAddress>Shipper@shipper.com</FromEMailAddress>
                                <FromName>Merchange</FromName>
                                <UndeliverableEMailAddress>Shipper@shipper.com</UndeliverableEMailAddress>
                                </EMailMessage>
                        </Notification>
        </PackageServiceOptions>
        <AdditionalHandling/>
        <ReferenceNumber>
                <Code>75</code>
                <Value>0123456789</Value>
        </ReferenceNumber>
        <Description>Letter to be returned</Description>
        <PackagingType>
                <Code>01</Code>
        </PackagingType>
</Package>
    </Shipment>
</ReturnRequest>
```

UPS Internet Shipping: View/Print Label

UPS Internet Shipping: View/Print Label 475

1. Print the label: Select Print from the File menu in this browser window to print the label below.

2. Fold the printed label at the dotted line. Place the label in a UPS Shipping Pouch. If you do not have a pouch, affix the folded label using clear plastic shipping tape over the entire label.

3. Getting Your Shipment to UPS 480
   Customers without a Daily Pickup
   Ground, 3 Day Select, and Standard to Canada shipments must be dropped off at an authorized UPS location, or handed to a US driver. Pickup service is not available for these services. To find the nearest drop-off location, select the Drop-off icon from the UPS tool bar.
   Air shipments (including Wouldwide Express and Expedited) can be picked up or dropped off. To schedule a pickup, or to find a drop-off location, select the Pickup or Drop-off icon from the UPS tool bar.
   Click here to find your nearest UPS Drop-off Location. 410

Customers with Daily Pickup 485
   Your driver will pickup your shipment(s) as usual.

FOLD HERE

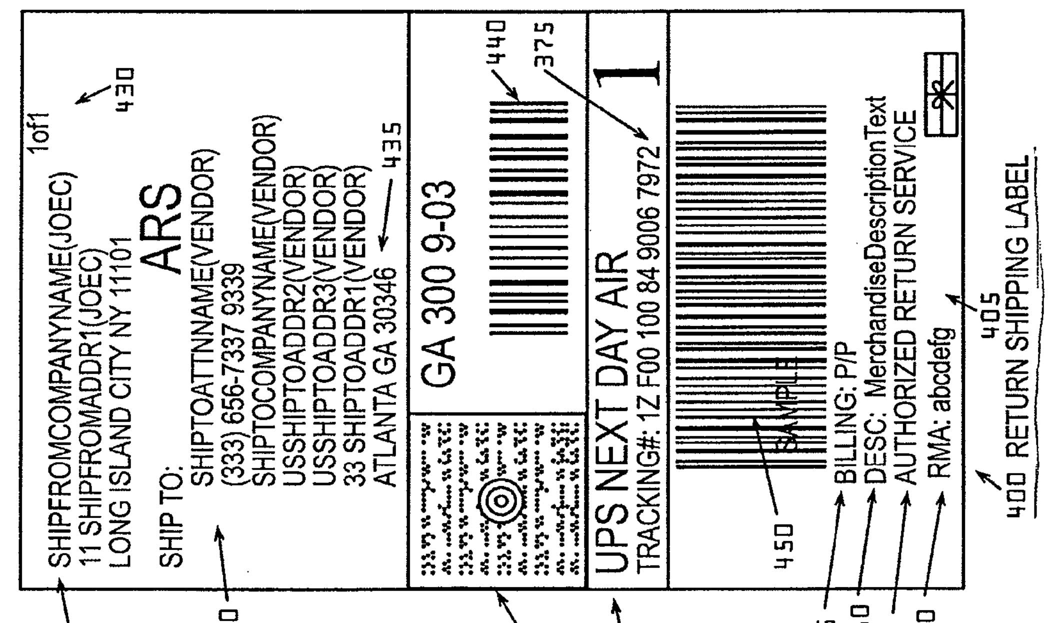

```
<?xml version = "1.0"?>
<ReturnResponse>                                    505
    <Response>                                          510
        <TransactionReference>
            <CustomerContext>
                <XpciVersion Version   ":1.0002"/>
            </CustomerContext>
        </TransactionReference>
        <ResponseStatusCode>1</ResponseStatusCode>              515
        <ResponseStatusDescription>Success</ResponseStatusDescription>
    </Response>
    <ShipmentResults>                        520
        <ShipmentCharge>
            <TransportationCharges>
                <CurrencyCode>USD</CurrencyCode>
                <MonetaryValue>3.5</MonetaryValue>
            </TransportationCharges>
            <ServiceOptionsCharges>
                <CurrencyCode>USD</CurrencyCode>
                <MonetaryValue>3.5</MonetaryValue>
            </ServiceOptionsCharges>
            <TotalCharges>
                <CurrencyCode>USD</CurrencyCode>
                <MonetaryValue>7.00</MonetaryValue>
            </Totalcharges>
        </ShipmentCharges>
                                              525
    <BillingWeight>
        <UnitOfMeasurement>
            <Code>LBS</Code?
        </UnitOfMeasurement>                                        530
        <Weight>0</Weight>
    </BillingWeight>
    <ShipmentIdentificationNumber>1Z123BDS4561268F9L</ShipmentIdentificaitonNumber>
    <PackageResults>
        <TrackingNumber>1Z123BDS4561268F9L</TrackingNumber>
        <TransportationCharges>
535         <CurrencyCode>USD</CurrencyCode>
            <MonetaryValue>3.5</MonetaryValue>
        </TransportationCharges>
        <ServiceOptionsCharges>
            <CurrencyCode>USD</CurrencyCode>
            <MonetaryValue>3.5</MonetaryValue>
        </ServiceOptionsCharges>
        <TotalPackageCharges>
            <CurrencyCode>USD</CurrencyCode>
            <MonetaryValue>7.00</MonetaryValue>
        </TotalPackageCharges>
    </PackageResults>
  </ReturnResponse>
</ReturnResponse>
```

*Fig. 7*

----------- Original Message -----------
From: ShipperName(MERCH) [mailto:esc1cbf@ups.com]
Sent: Tuesday, March 06, 2001 11:50 AM
To: esc1gsc@ups.com
Subject: ReturnNotSubjectTest UPS ReturnNotification Message: 555

This notice is to alert you that a shipment is in transit to:
ShipToAttnName*(VENDOR)
ShipToCompanyName(VENDOR0 420
33 ShipToAddr1(VENDOR)
USShipToAddr2(VENDOR)
USShipToAddr3(VENDOR)
Atlanta, GA 30346

This shipment was processed on Tue mar 06 11:49:57 EST 2001 by:
ShipFromAttnName(JOEC)
ShipFromCompanyName(JOEC)
11 ShipFromAddr1(JOEC) 415
USShipFromAddr2(JOEC)
USShipFromAddr3(JOEC)
Long Island City, NY 11101

This shipment was processed by UPS OnLine Tools.
To learn more about the benefits fo shipping with UPS OnLine, please4 see:
http://ec,ups.com Shipment Detail: 375
Tracking# for Shipment: 1ZF001008493498233 460
Merchandise Description: MerchandiseDescriptionTest Additional Detail: 427
UPS Service Level: Next Day Air
Shipment Weight: 4.0 LBS 430
RMA: abcdefg 470

You can track the shipment at any time from the following URL:
http://wwwapps.ups.com/etracking/tracking.cgi?tracknum=1ZF001008493498233
Or go to http://wwwapps.ups.com/etracking/tracking.cgi
and enter the tracking number.

```
<?xml version="1.0"?>
- <returnNotificationEMail>
  - <Shipper>                                                         340
      <Name>ShipperName(MERCH)</Name>
      <AttentionName>ShipperAttnName*MERCH)</AttentionName>
    - <Address)
        <AddressLine1>22 ShipperAddr1</AddressLine1>
        <City>Belle Mead</City>
        <StateProvincecode>NJ</StateProvinceCode>
        <PostalCode>08502</PostalCode>
        <Country>US</Country>
      </Address>
    </Shipper>                                                        415
  - <ShipFrom>
      <CompanyName>ShipFromCompanyName(JOEC)</CompanyName>
      <AttentionName>ShipFromAttnName(JOEC)</AttentionName>
    - <Address>
        <AddressLine1>11 ShipFromAddr1(JOEC)</AddressLine1>
        <AddressLine2>USShipFromAddr2(JOEC)</AddressLine2>
        <AddressLine3>USShipFromAddr3(JOEC)</AddressLine3>
        <City>Long Island City</City>
        <StateProvinceCode>NY</StateProvinceCode>
        <PostalCode>30346>/PostalCode>
        <Country>US</Country>
      </Address>
    </ShipFrom>
  - <Ship/To>                                                         420
      <CompanyName>ShiperName(MERCH)</CompanyName>
    - <Address>
        <AddressLine1>33 ShipToAddr1(VENDOR)</AddressLine1>
        <AddressLine2>USShipToAddr2(VENDOR)</AddressLine2>
        <AddressLine3>USShiptroAddr3(VENDOR)</AddressLine3>
        <City>Atlanta</City?
        <StateProvinceCode>GA</StateProvinceCode>
        <Country>US</Country>
      </Address>
    </ShipTo>                                                         460
    <Description>MerchandiseDescriptionTest</Description>
  - <packageweight>
    - <UnitOfMeasurement>                                             430
        <Code>LBS</Code>
      </UnitOfMeasurement>
      <Weight>4.0</Weight>
    </PackageWeight>                                                  470
  - <ReferenceNumber>
      <Code>75</Code)
      <Value>abcdefg</Value>
    </ReferenceNumber>                                                375
    <TrackingNumber>1ZF001008493498233</TrackingNumber>
</ReturnNotificationEMail>
```

Fig. 8B

SYSTEM AND METHOD FOR INITIATING RETURNS OVER A NETWORK

CROSS-REFERENCE TO RELATED APPLICATIONS

This application is a divisional of U.S. application Ser. No. 11/828,864, filed Jul. 26, 2007, now U.S. Pat. No. 7,430,527 which is a divisional of U.S. application Ser. No. 10/098,634, filed Mar. 13, 2002 (now U.S. Pat. No. 7,266,513 that issued on Sep. 4, 2007), which claims priority to Provisional Application No. 60/275,861, filed Mar. 14, 2001, all of which are hereby incorporated herein in their entirety by reference.

FIELD OF THE INVENTION

The present invention is a method and system for providing return shipping labels to merchants and customers as part of an electronic return system.

BACKGROUND OF THE INVENTION

The increased popularity of the World Wide Web has led to an explosion in catalog and online shopping. The growth in e-commerce reflects in part increased purchases from veteran online shoppers, deeper Internet penetration across the country and the increased number of familiar bricks-and-mortar retailers online.

Some of the benefits to purchasing products online include the ability to avoid crowds, perform quick price comparisons across multiple sellers, and access a wider selection of products. However, there are drawbacks to purchasing goods through a retailer web site. One drawback is the inability to inspect an item before making the purchase. A consumer that buys a product offline at a traditional retail store usually has the opportunity to inspect the color, size and quality of workmanship of a good before the purchase is made. In contrast, when a consumer shops online their decision to purchase is based largely on a written description of the product and/or a photograph of the item. No opportunity to inspect the product occurs until after the product is purchased and shipped to the consumer. As a result, many products that are purchased online are returned.

The typical return transaction involves a customer contacting a merchant, via email or phone, to inform the merchant that the customer intends to return an item previously purchased from the merchant. After approving the return, the merchant obtains a return shipping label from a commercial carrier, such as the United Parcel Service (UPS), and mails the return shipping label to the customer, along with any special instructions on how to package the item to be returned. Next, the customer repackages the item, affixes the return shipping label to the package and drops the package off with the shipper, who delivers it to the merchant.

This return process is both time consuming and highly manual. It usually takes a week or more for the merchant to obtain a return shipping label from a carrier and have the label mailed to the consumer. In addition, the merchant must have customer service representatives available to receive and approve the customer return request, and to initiate the request to the carrier to have a return shipping label generated. Further, if the label is lost or destroyed in the mailing process, additional delays and expense can result as the consumer contacts the merchant and re-initiates the returns process.

An alternative returns process is sometimes used to avoid some of the delays discussed above. In the alternative returns process, the merchant has a return shipping label generated for every product sold and encloses the label with the product when it is sent to the customer. The benefit of the alternative return process is that a customer that wishes to return an item no longer needs to contact the merchant and already has the label required to return the good. While this eliminates many of the delays inherent in the traditional returns process, the merchant is at a disadvantage. By including a return shipping label when the product is sent to the customer, the merchant essentially abrogates the right to refuse a return. And because the merchant is not notified when a customer decides to return an item, the merchant has no idea as to which or how many items are going to be returned, which can lead to inventory management problems. In addition, if the shipping label sent to the consumer is missing, lost or destroyed, the delays associated with providing a replacement shipping label return.

A need therefore exists in the industry for a returns system that eliminates the delays inherent in the traditional returns process yet allows a merchant to retain to have knowledge and control of the process. Thus, an unsatisfied need exists for an improved method and system for handling product returns that overcomes deficiencies in the prior art, some of which are discussed above.

BRIEF DESCRIPTION OF THE DRAWINGS

Figure 1:
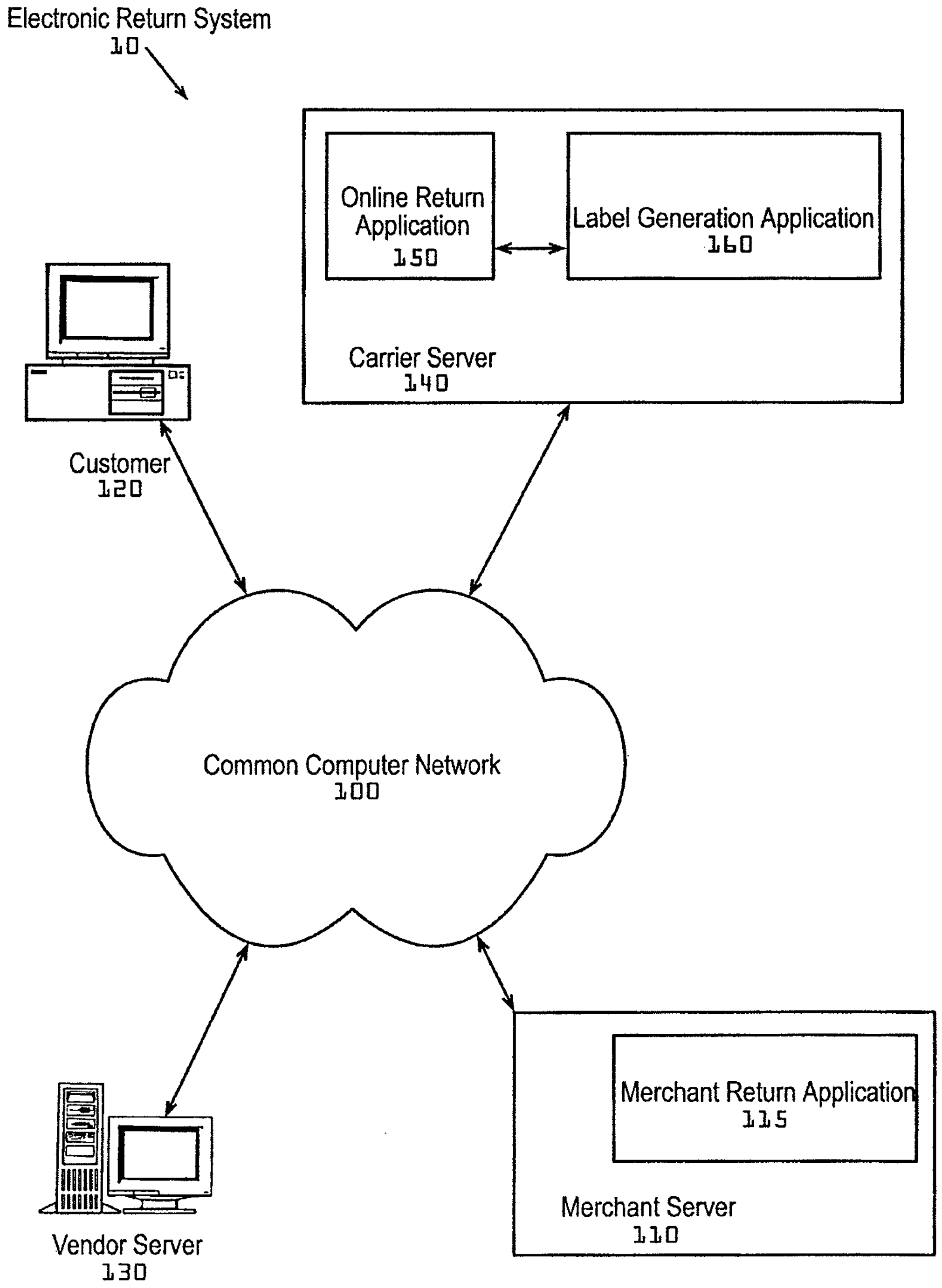

Having thus described the invention in general terms, reference will now be made to the accompanying drawings, which are not necessarily drawn to scale, and wherein:

FIG. 1 is a high-level block diagram of an electronic return system in accordance with an embodiment of the present invention.

Figure 2:
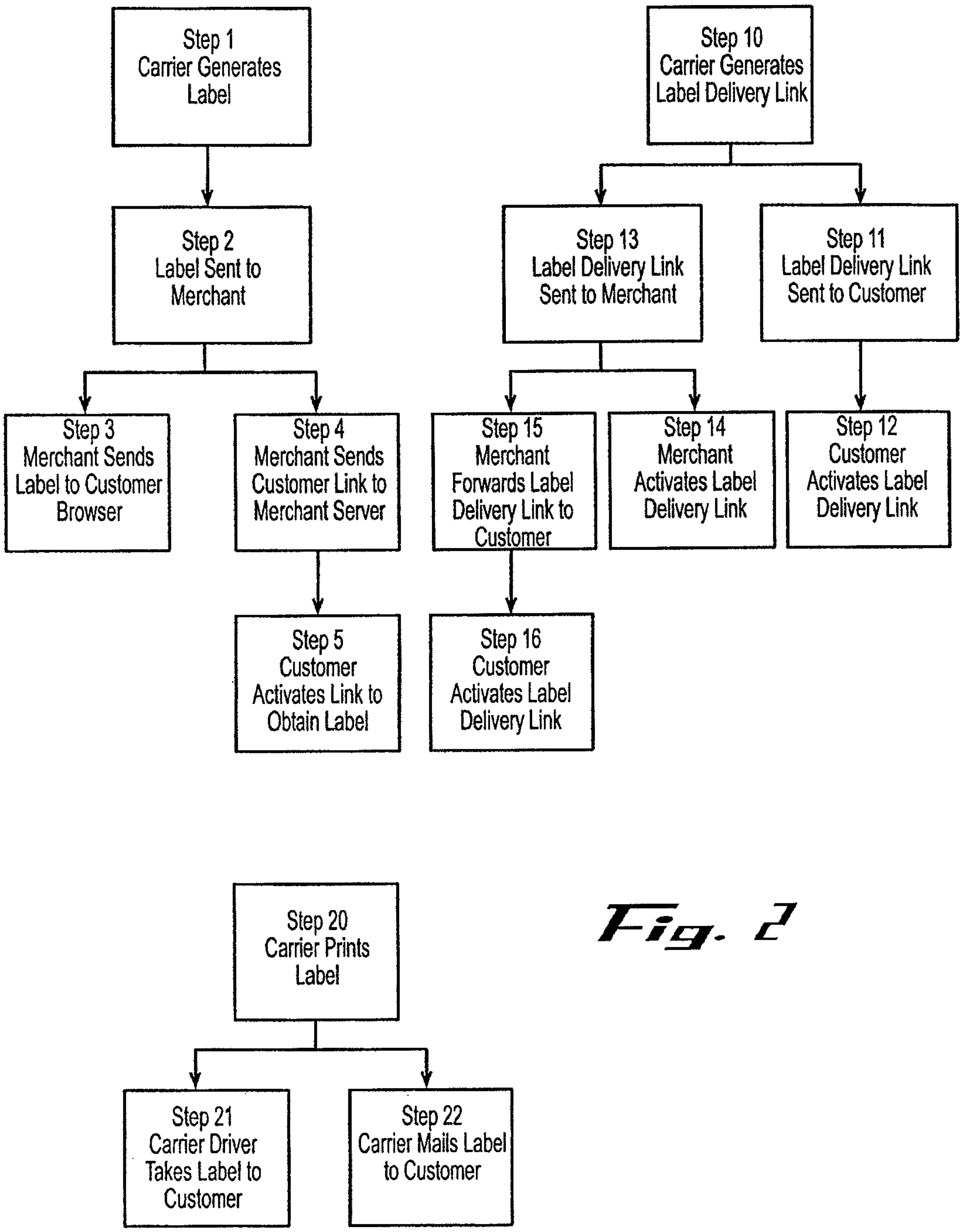

FIG. 2 is a high-level process flow diagram that shows several embodiments of the present invention.

Figure 3:
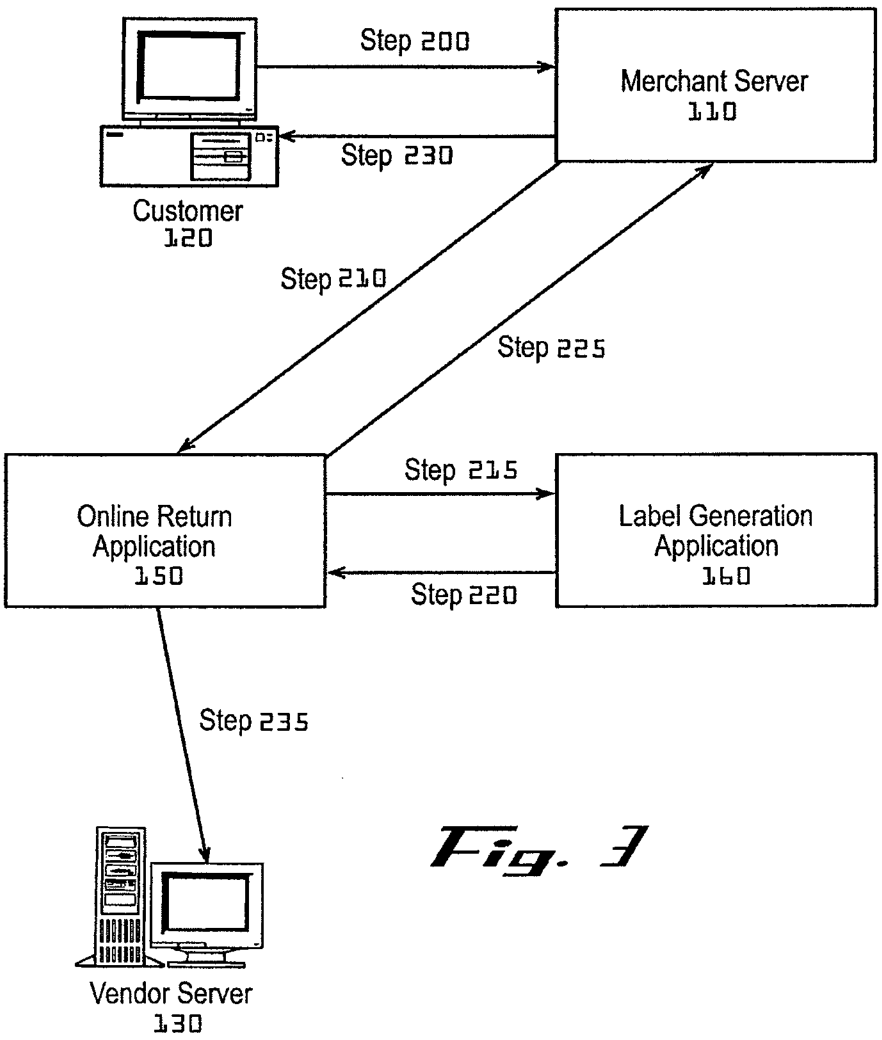

FIG. 3 is a high-level block diagram that illustrates the operation of an electronic return system in accordance with a first embodiment of the present invention.

FIGS. 4A-4F are illustrative screen shots of web pages that a customer uses to navigate a merchant return system in accordance with an embodiment of the present invention.

FIGS. 5A-5B show a record layout of a return service request in accordance with an embodiment of the present invention.

FIG. 6 illustrates a return shipping label and label instruction area in accordance with an embodiment of the present invention.

FIG. 7 shows a record layout of a return service response in accordance with an embodiment of the present invention.

FIGS. 8A-8B illustrate an electronic return notification in accordance with an embodiment of the present invention.

Figure 9:
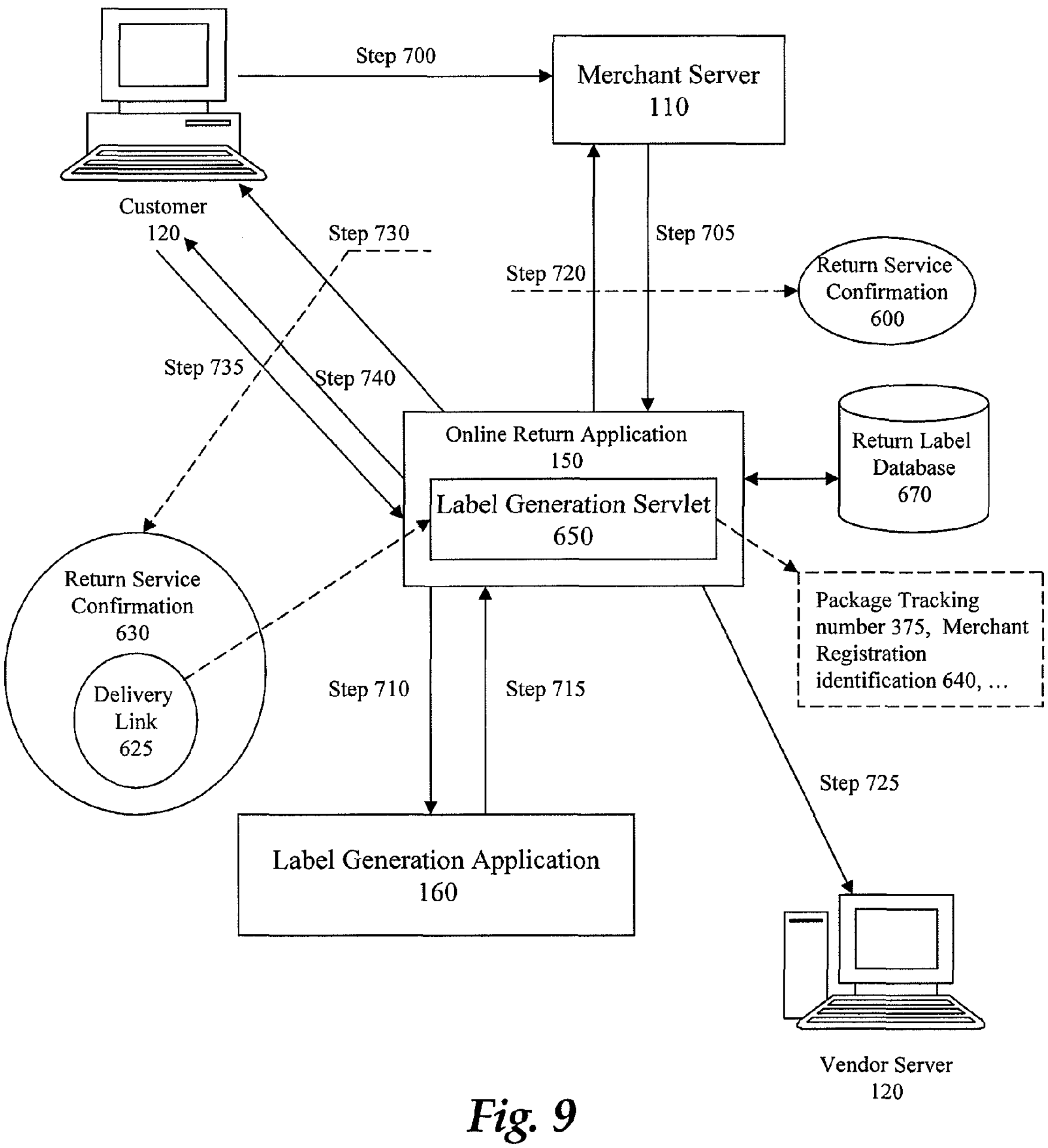

FIG. 9 is a high-level block diagram that illustrates the operation of an electronic return system in accordance with a second embodiment of the present invention.

Figure 10:
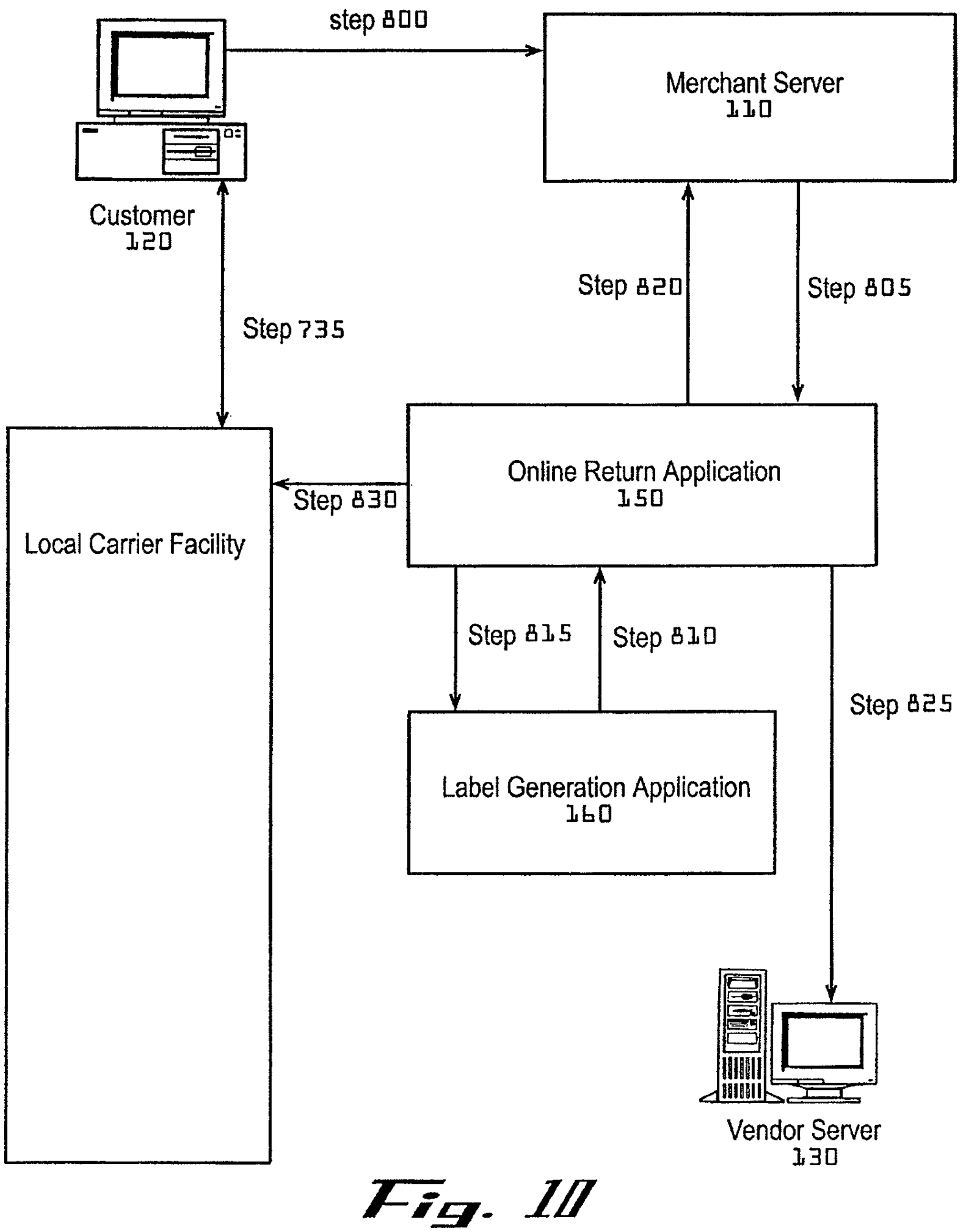

FIG. 10 is a high-level block diagram that illustrates the operation of an electronic return system in accordance with a third embodiment of the present invention.

Figure 11:
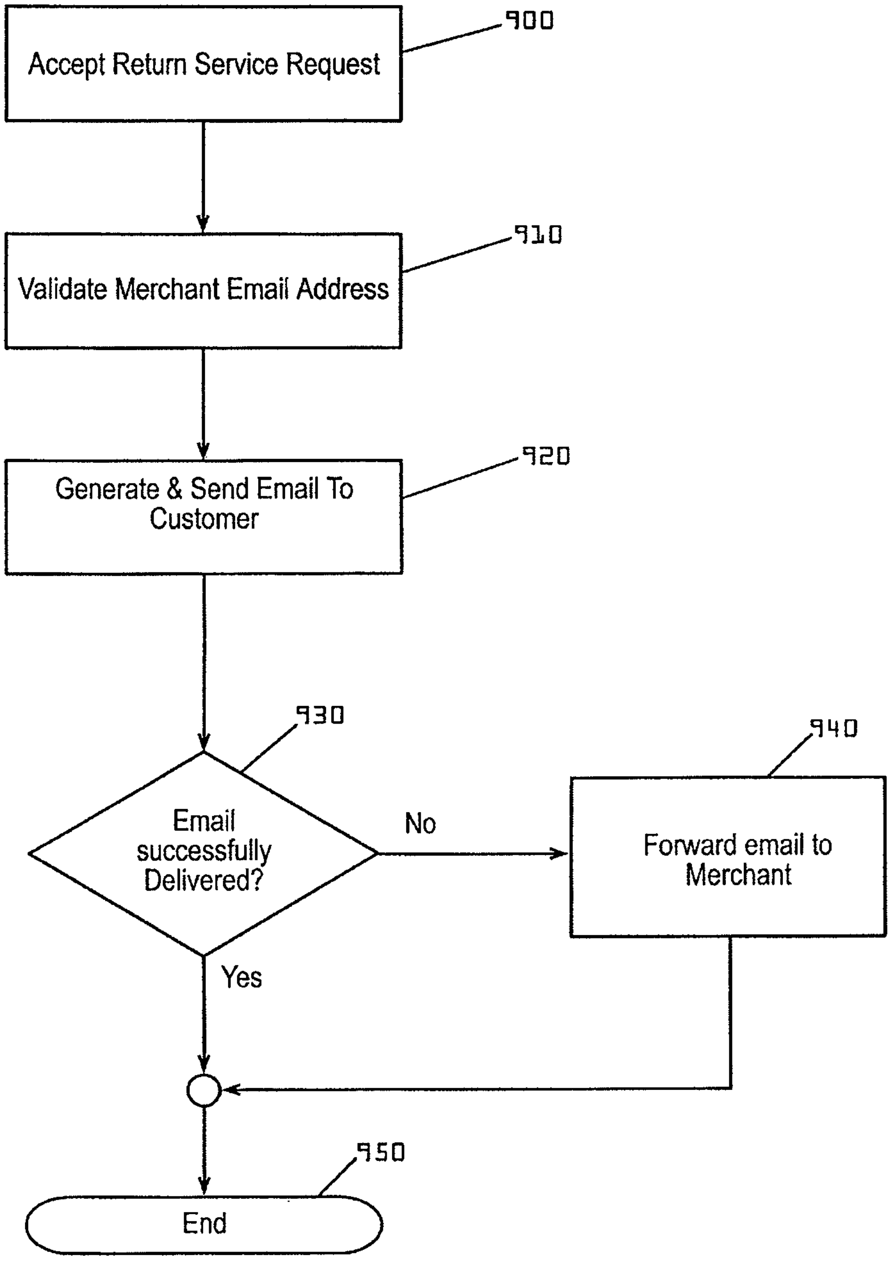

FIG. 11 is a process flow diagram that illustrates a method of handling undeliverable emails in accordance with an embodiment of the present invention.

SUMMARY OF THE INVENTION

The present invention provides systems and methods for processing return transactions over a network. An embodiment of the invention discloses an online return application that generates an electronic return shipping label that can be delivered to a browser of a customer that wishes to make a return. Also, disclosed is the creation and transmission of label delivery links, which provide for dynamic generation and delivery of shipping labels.

In accordance with an embodiment of the present invention an electronic return shipping system is disclosed that includes a merchant application residing on a merchant computer, the merchant application configured to generate a return service request in response to a request from a customer to return a good previously purchased from a merchant; an online return application in electronic communication with the merchant application; the online return application configured to receive the return service request and generate a shipping label based at least in part on the return service request; and wherein the online return application is further configured to electronically deliver the shipping label to the customer.

In accordance with an embodiment of the present invention an electronic return shipping system is disclosed that includes a merchant application residing on a merchant computer, the merchant application configured to generate a return service request in response to a request from a customer to return a good previously purchased from a merchant; an online return application in electronic communication with the merchant application; the online return application configured to receive the return service request and generate a shipping label based at least in part on the return service request; and wherein the online return application is further configured to electronically deliver the shipping label to the customer; and wherein further the online return application is configured to store an electronic image of the shipping label, and send to the customer a link associated with the stored electronic image.

In accordance with an embodiment of the present invention an electronic return shipping system is disclosed that includes a merchant application residing on a merchant computer, the merchant application configured to generate a return service request in response to a request from a customer to return a good previously purchased from a merchant; an online return application in electronic communication with the merchant application; the online return application configured to receive the return service request and generate a shipping label based at least in part on the return service request; and wherein the online return application is further configured to electronically deliver the shipping label to the customer; and wherein further the online return application is configured to store an electronic image of the shipping label, and send to the merchant a link associated with the stored electronic image.

In accordance with an embodiment of the present invention an electronic return shipping system is disclosed that includes a merchant application residing on a merchant computer, the merchant application configured to generate a return service request in response to a request from a customer to return a good previously purchased from a merchant; an online return application in electronic communication with the merchant application; the online return application configured to receive the return service request and generate a shipping label based at least in part on the return service request; and wherein the online return application is further configured to format and send a label delivery link that is associated with the shipping label and includes a hypertext link to a uniform locator address.

In accordance with an embodiment of the present invention an electronic return shipping system is disclosed that includes a merchant application residing on a merchant computer, the merchant application configured to generate a return service request in response to a request from a customer to return a good previously purchased from a merchant; an online return application in electronic communication with the merchant application; the online return application configured to receive the return service request and generate a shipping label based at least in part on the return service request; and wherein the online return application is further configured to format and send a label delivery link that is associated with the shipping label and includes a hypertext link to a uniform locator address; and wherein the online return application is configured to send the label delivery link to the merchant via electronic mail.

In accordance with an embodiment of the present invention an electronic return shipping system is disclosed that includes a merchant application residing on a merchant computer, the merchant application configured to generate a return service request in response to a request from a customer to return a good previously purchased from a merchant; an online return application in electronic communication with the merchant application; the online return application configured to receive the return service request and generate a shipping label based at least in part on the return service request; and wherein the online return application is further configured to format and send a label delivery link that is associated with the shipping label and includes a hypertext link to a uniform locator address and wherein the uniform resource locator of the label delivery link corresponds to a label generation application, the label generation application configured to deliver the shipping label to a browser associated with the customer upon activation of the label delivery link.

In accordance with an embodiment of the present invention an electronic return shipping system is disclosed that includes a merchant application residing on a merchant computer, the merchant application configured to generate a return service request in response to a request from a customer to return a good previously purchased from a merchant; an online return application in electronic communication with the merchant application; the online return application configured to receive the return service request and generate a shipping label based at least in part on the return service request; and wherein the online return application is further configured to format and send a label delivery link that is associated with the shipping label and includes a hypertext link to a uniform locator address and wherein the uniform resource locator of the label delivery link corresponds to a label generation application, the label generation application configured to deliver the shipping label to a browser associated with the customer upon activation of the label delivery link; and wherein further the label generation application is a Java application.

In accordance with an embodiment of the present invention an electronic return shipping system is disclosed that includes a merchant application residing on a merchant computer, the merchant application configured to generate a return service request in response to a request from a customer to return a good previously purchased from a merchant; an online return application in electronic communication with the merchant application; the online return application configured to receive the return service request and generate a shipping label based at least in part on the return service request; and wherein the online return application is further configured to format and send a label delivery link that is associated with the shipping label and includes a hypertext link to a uniform locator address and wherein the uniform resource locator of the label delivery link corresponds to a label generation application, the label generation application configured to deliver the shipping label to a browser associated with the customer upon activation of the label delivery link; and wherein further the label delivery link includes at least one of a package tracking number, a locality string, a merchant registration identification and a shipping label creation date.

In accordance with an embodiment of the present invention an electronic return shipping system is disclosed that includes a merchant application residing on a merchant computer, the merchant application configured to generate a return service request in response to a request from a customer to return a good previously purchased from a merchant; an online return application in electronic communication with the merchant application; the online return application configured to receive the return service request and generate a shipping label based at least in part on the return service request; and wherein the online return application is further configured to format and send a label delivery link that is associated with the shipping label and includes a hypertext link to a uniform locator address and wherein the uniform resource locator of the label delivery link corresponds to a label generation application, the label generation application configured to deliver the shipping label to a browser associated with the customer upon activation of the label delivery link; wherein further the online return application is configured to generate an electronic return notification that contains both a human-readable area and a machine-readable area.

In accordance with an embodiment of the present invention a method of electronically providing a shipping label to a customer that wishes to return a good that was previously purchased from a merchant is disclosed that includes the steps of initiating a return transaction upon receipt of a return service request, wherein the return service request contains shipping information, the shipping information comprising an address associated with the customer and an address associated with a consignee; assigning a package tracking number to said return transaction; generating the shipping label based at least in part on the shipping information and the package tracking number; and providing the shipping label to the customer in electronic form.

In accordance with an embodiment of the present invention a method of electronically providing a shipping label to a customer that wishes to return a good that was previously purchased from a merchant is disclosed that includes the steps of initiating a return transaction upon receipt of a return service request, wherein the return service request contains shipping information, the shipping information comprising an address associated with the customer and an address associated with a consignee; assigning a package tracking number to the return transaction; generating the shipping label based at least in part on the shipping information and the package tracking number; and providing the customer with an electronic image of the generated shipping label.

In accordance with an embodiment of the present invention a method of electronically providing a shipping label to a customer that wishes to return a good that was previously purchased from a merchant is disclosed that includes the steps of initiating a return transaction upon receipt of a return service request, wherein the return service request contains shipping information, the shipping information comprising an address associated with the customer and an address associated with a consignee; assigning a package tracking number to the return transaction; generating the shipping label based at least in part on the shipping information and the package tracking number; and delivering an electronic image of the shipping label to a browser associated with the customer.

In accordance with an embodiment of the present invention a method of electronically providing a shipping label to a customer that wishes to return a good that was previously purchased from a merchant is disclosed that includes the steps of initiating a return transaction upon receipt of a return service request, wherein the return service request contains shipping information, the shipping information comprising an address associated with the customer and an address associated with a consignee; assigning a package tracking number to the return transaction; generating the shipping label based at least in part on the shipping information and the package tracking number; storing an electronic image of the shipping label; and sending the customer a link associated with the stored image.

In accordance with an embodiment of the present invention a method of electronically providing a shipping label to a customer that wishes to return a good that was previously purchased from a merchant is disclosed that includes the steps of initiating a return transaction upon receipt of a return service request; generating the shipping label based at least in part on the return service request; formatting a label delivery link that is associated with the shipping label and includes a hypertext link to a uniform resource locator address; providing the customer with the label delivery link; and delivering the shipping label to a browser associated with the customer upon activation of the label delivery link.

In accordance with an embodiment of the present invention a method of electronically providing a shipping label to a customer that wishes to return a good that was previously purchased from a merchant is disclosed that includes the steps of initiating a return transaction upon receipt of a return service request; generating the shipping label based at least in part on the return service request; formatting a label delivery link that is associated with the shipping label and includes a hypertext link to a uniform resource locator address; providing the merchant with the label delivery link; and delivering the shipping label to a browser associated with the customer upon activation of the label delivery link.

In accordance with an embodiment of the present invention a method of electronically providing a shipping label to a customer that wishes to return a good that was previously purchased from a merchant is disclosed that includes the steps of initiating a return transaction upon receipt of a return service request; generating a shipping label based at least in part on the return service request; printing the shipping label at a carrier facility; taking the printed shipping label from the carrier facility to the customer; affixing the shipping label to a package containing the good to be returned; and delivering the package to the merchant.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

A. Architecture

FIG. 1 is a high-level diagram of an electronic return system 10 for practicing various aspects of an embodiment of the present invention. In this embodiment, the present invention includes a merchant server 110, a customer 120, a vendor server 130 and a carrier server 140, each in communication using a common computer network 100. As used herein, the term customer 120 includes, without limitation, an individual or an entity, with or without a personal computer. In the disclosed embodiment, the common computer network 100 is the Internet. But it will be readily apparent to one of ordinary skill in the art that the present invention may be implemented in any networked environment. Moreover, and as disclosed in more detail below, some of the communications described herein may occur by means other than the common computer network 100.

As described herein, the customer 120 is the buyer of a good that wishes to return it. In a preferred embodiment, the merchant 110 is the entity that sold the good to the customer 120 and the vendor 130 is the entity that receives the good that is being returned. In some cases, of course, a merchant may require that goods be returned directly to the merchant, in which case a vendor may not be involved in the returns process. Although the present invention is broad enough to include this situation, in the disclosed embodiment it will be assumed that a merchant and a vendor are involved in the returns process. Finally, other electronic returns models can, of course, exist that make use of the present invention and these are intended to be encompassed by the following disclosure as well.

In a preferred embodiment, the merchant 110, vendor 130 and carrier 140 servers are capable of transmitting and receiving data over the network 100 using standard Internet protocols, including HTTP and HTTPS. Similarly, the customer 120 has a computer that can send and receive electronic mail and that is equipped with a web browser capable of viewing web pages. As explained below, however, the present invention can be implemented even if one or more of these entities are not connected to the network 100. As a non-limiting example, the electronic return system described herein will work if a customer 120 uses a phone rather than a computer to contact a merchant to request a return.

In addition, the present invention may apply to the situation in which a customer buys a good from a physical location, such as a merchant retail store and later decides to return the good. Rather than returning to the physical location of the merchant, the customer may elect to use the present invention to initiate the return.

Also in a preferred embodiment, an online return application 150 and a label generation application 160 reside on the carrier server 140, and a merchant return application 115 resides on the merchant server 110. It will be readily apparent to one of ordinary skill in the art that one or more of these applications can reside elsewhere. For example, a label generation application may reside on a separate server operated by the carrier or might exist as a carrier component on the merchant server 110. The operations of the various applications are described in detail below and the present invention is broad enough and intended to encompass embodiments in which the applications reside on these or other computers.

B. Operation

In accordance with the present invention, several embodiments of a system are herein described that will process a customer's request to return a good purchased from a merchant. FIG. 2 is a high-level process flow diagram that illustrates several of these embodiments.

In each of the herein-described systems, a customer contacts a merchant and requests the return of a good. Upon approval of the return request, the merchant contacts an online return application 150 and provides the shipping information necessary to generate a return shipping label. In each of the described embodiments, the ship from information is address information associated with the customer. The merchant may have the ship from information on file or may prompt the customer to enter and/or modify the ship from information as part of the return transaction. The destination or consignee information of the shipping label may be a merchant address or a vendor address, depending on where the product is to be returned.

In the first process flow shown in FIG. 2, the carrier generates a label in Step 1 and returns the label to the merchant in Step 2. As described in greater detail below, the shipping label that is generated and transmitted to the merchant may be formatted via Graphics Interchange Format (GIF), Eltron Programming Language (EPL2), portable document format (PDF) or via other formats known in the art. The merchant then has the option of presenting the label image to the customer's browser (Step 3) or to store the label on the merchant server and provide the customer with a hyper-text link to the label via email (Steps 4 and 5).

Another embodiment of the present invention is illustrated by the second process flow of FIG. 2. In this process flow, instead of transmitting a label image, the carrier generates a label delivery link to the carrier server. In this embodiment, the information necessary to generate a shipping label is embedded in the link. When the label delivery link is activated, either by the merchant or customer, a call is made to the label generation servlet and a shipping label is dynamically generated and delivered to the customer browser.

In Step 10, the carrier generates a label delivery link in response to a return request. If the merchant decides to have the label delivery link sent directly to the customer, the process proceeds to Step 11 and the carrier sends an email containing the label link to the customer. In Step 12, the customer activates the label delivery link, which causes a shipping label to be generated and delivered to the customer's browser. Alternatively, the merchant can have the process proceed to Step 13 where the label delivery link is sent to the merchant. At that point, the merchant can either activate the label link and have the shipping label delivered to the customer browser (Step 14), or the merchant can forward the label delivery link to the customer via email and permit the customer to activate the link (Steps 15 and 16).

In the final process flow shown in FIG. 2, the online return application 150 determines the carrier site closest to the customer and prints the generated shipping label at the local carrier site (Step 20). The process then can proceed to Step 21 wherein a carrier driver takes the label to the customer, affixes the label to the package and accepts the package. Alternatively, the carrier will mail the label to the customer and have the customer assume responsibility for affixing the label and delivering the labeled package to a carrier drop off location.

The following paragraphs describe in greater detail the various embodiments summarized above.

FIG. 3 is a high-level diagram that illustrates a first method by which an online return application 150 processes a return request from a customer 120. The process starts in Step 200 with a customer 120 contacting a merchant and notifying the merchant that the customer wishes to return a good that the customer previously purchased. The following paragraphs describe a situation in which a customer 120 contacts the merchant through a merchant website. But it will be readily apparent that a customer 120 might request a return over the telephone through a customer service representative or by phoning the merchant directly. These and other methods by which a customer 120 might submit a return request are encompassed by this invention.

FIGS. 4A-4F illustrate the type of web pages that a merchant might use to permit a user to submit a return request. The term user is used rather than customer to expressly include the situation in which a customer 120 communicates with a customer service representative that uses a merchant website to enter the customer's return request.

Figure 4A:
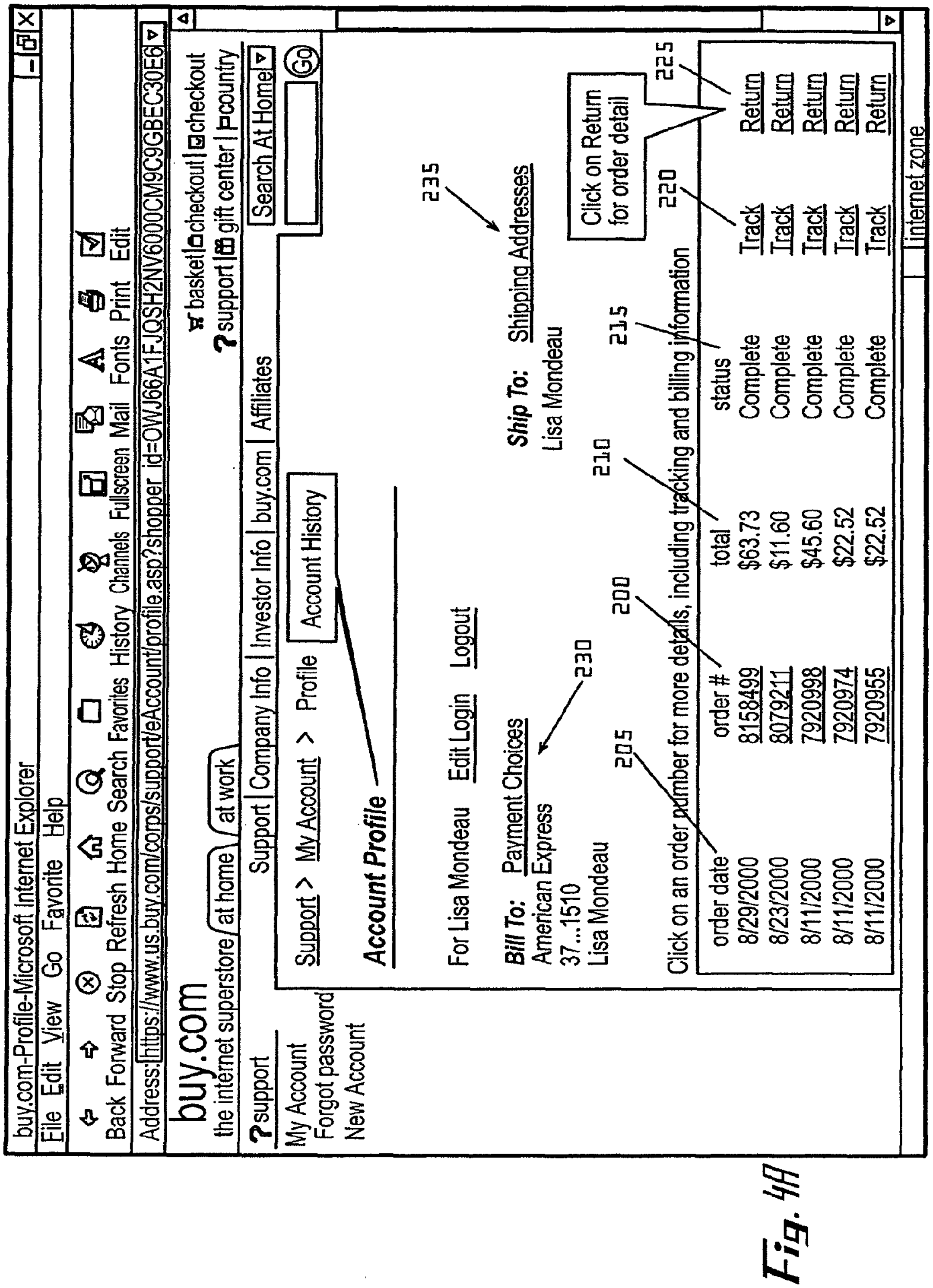

FIG. 4A shows a merchant web page that lists the prior orders 200 that a customer 120 has placed with the merchant along with the order date 205, total 210 and status 215 associated with each order 200. For each order 200, the customer 120 is given the option of clicking on a hyperlink labeled "Track" 220 to track an order shipment or "Return" 225 to initiate the process of requesting a return. Additional options on the web page of FIG. 4A include links to change billing 230 and shipping address 235 information.

Figure 4B:
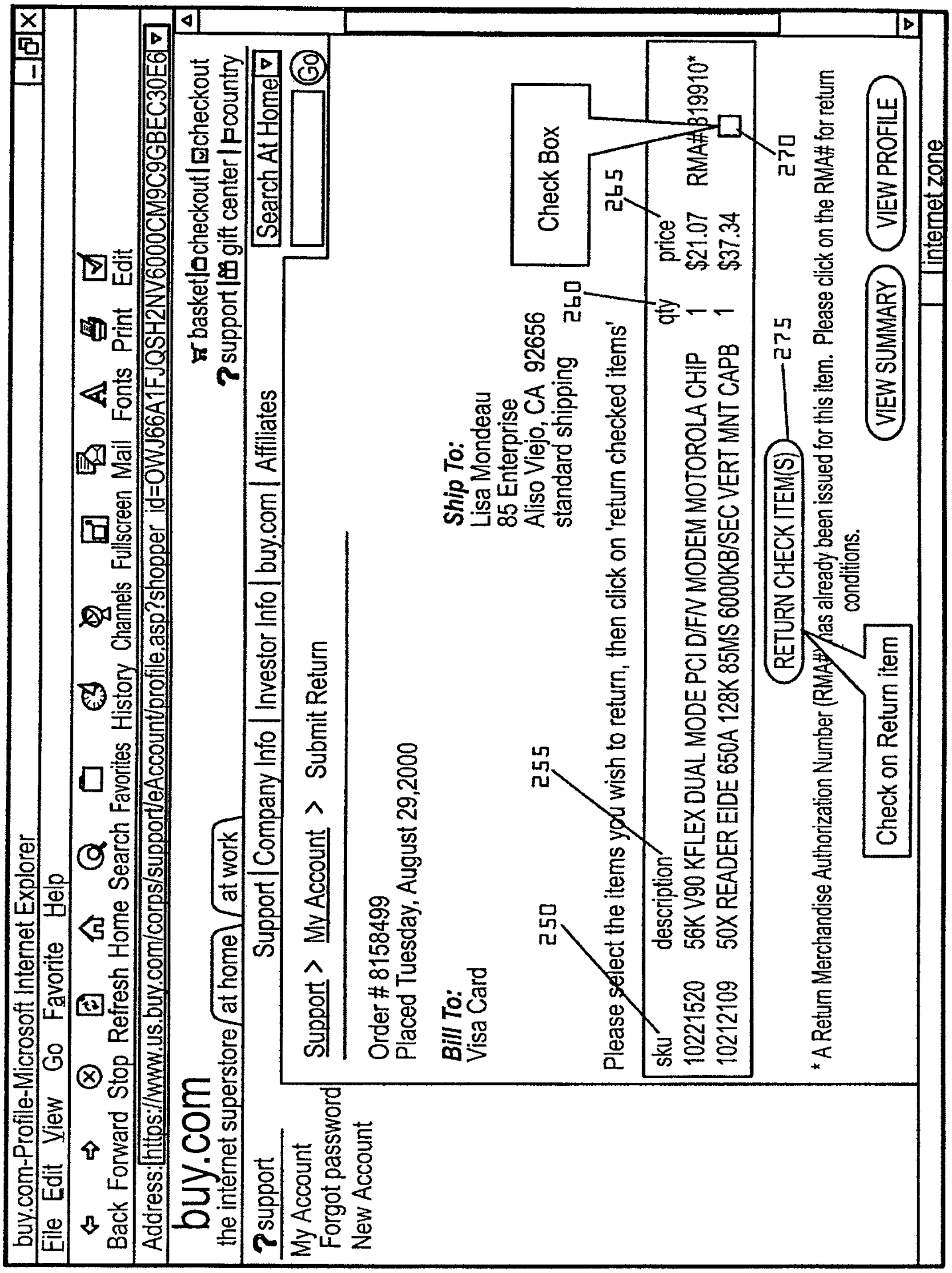

In this example, if the customer 120 clicks the return link 225 corresponding to order number 815499 the merchant server 110 links to a web page such as that shown in FIG. 4B. This web page lists the goods that comprise order 815499 and includes a stockkeeping unit (SKU) number 250, a good description 255, the quantity 260 of a particular good purchased in the order and a price 265 paid for the good. There are two goods listed in FIG. 4B: a 56K V90 KFLEX Dual Mode PCI D/F/V Modem Motorola Chip ("Motorola chip") and a 50× Reader EIDE 650A 128k 85 ms 6000 kb/sec Vert Mnt Capb ("50.times.reader"). In this example, a return merchandise authorization (RMA) #319910 has already been issued for the Motorola chip. This may be because the customer 120 previously submitted a return request for the Motorola chip or that the merchant has a policy to automatically grant return requests associated with the chip. As to the 50× reader, the customer 120 is given the option of checking a check box 270 to request a return of that item.

Figure 4C:
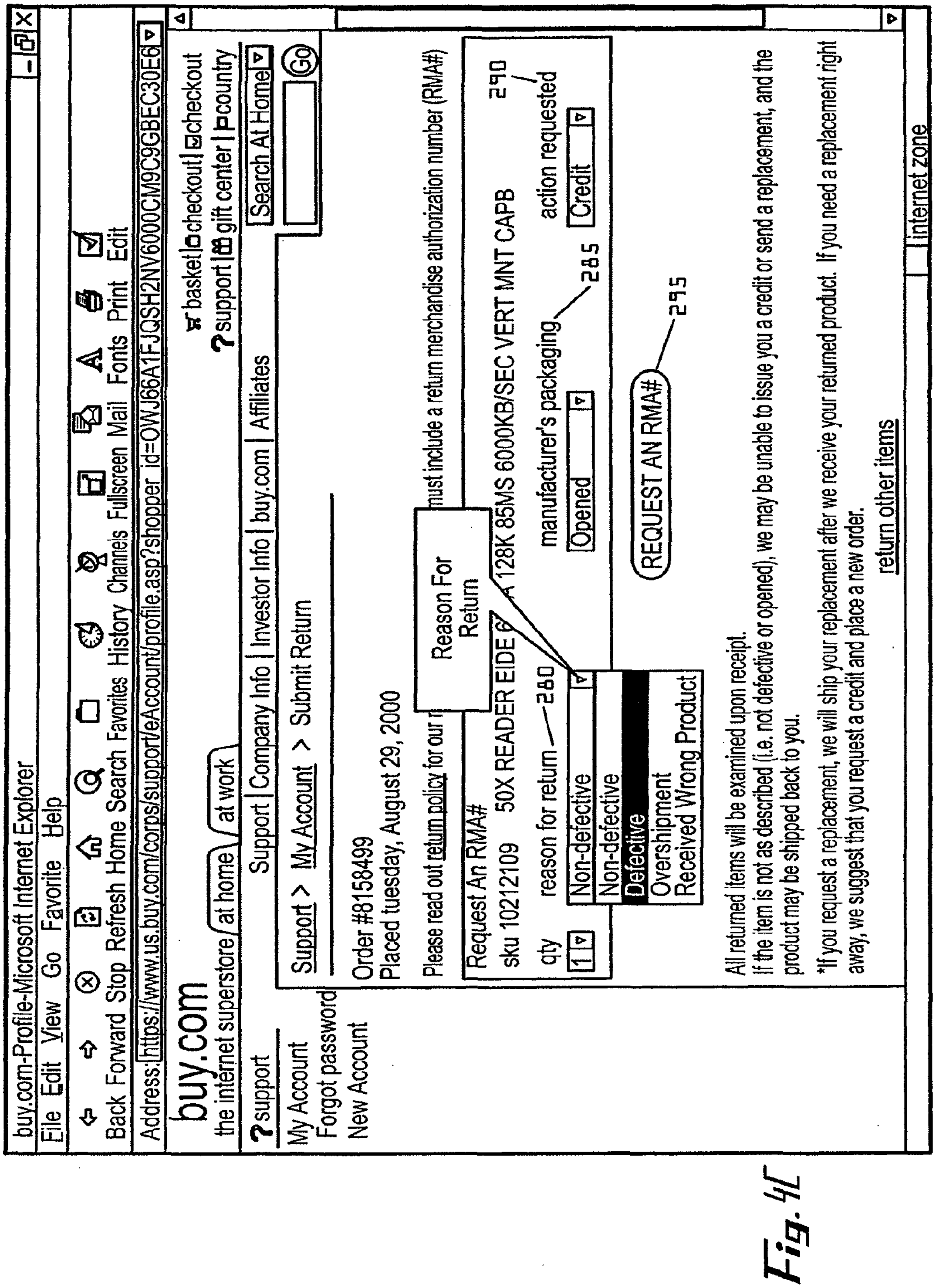
Figure 4D:
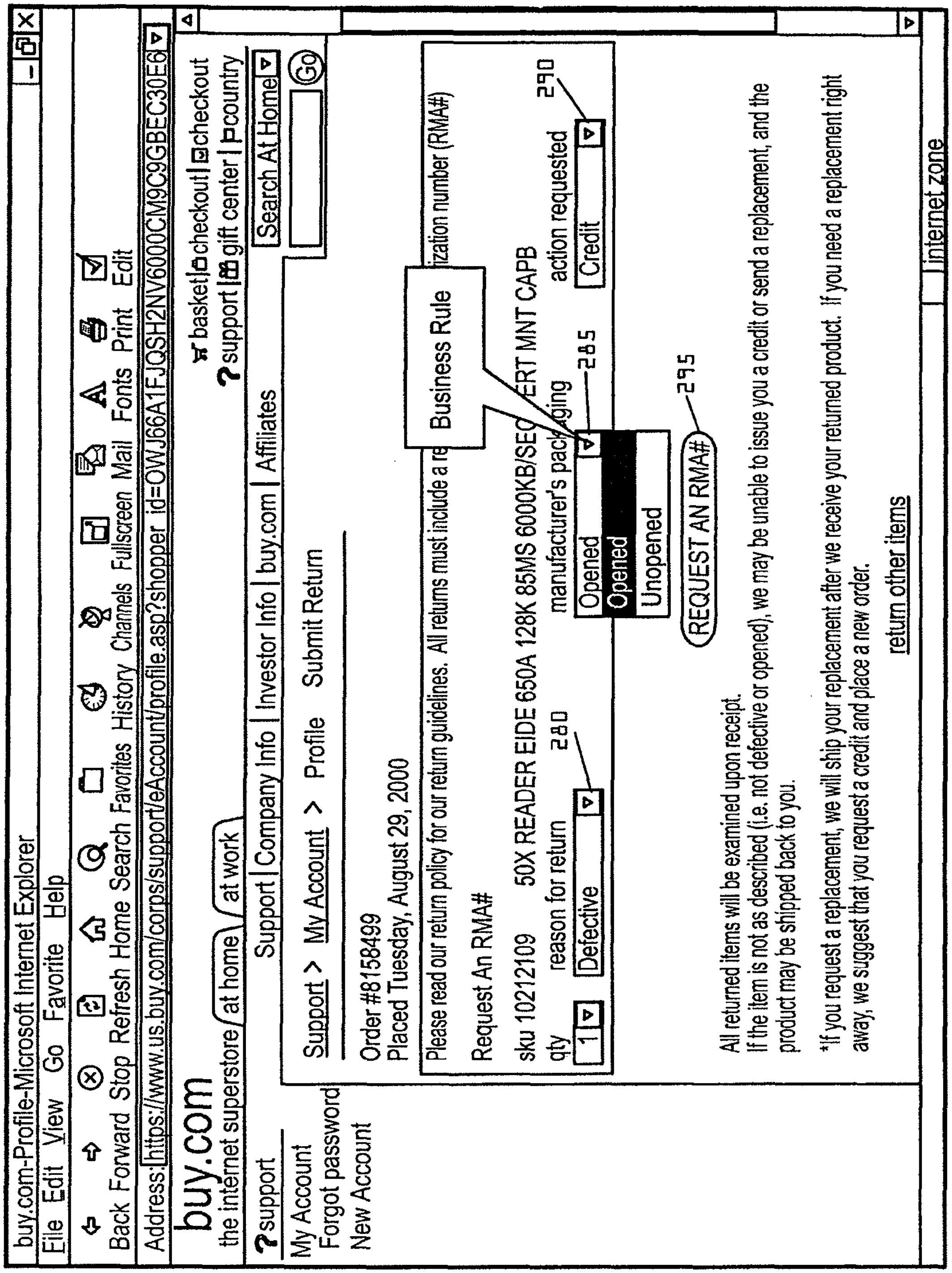
Figure 4E:
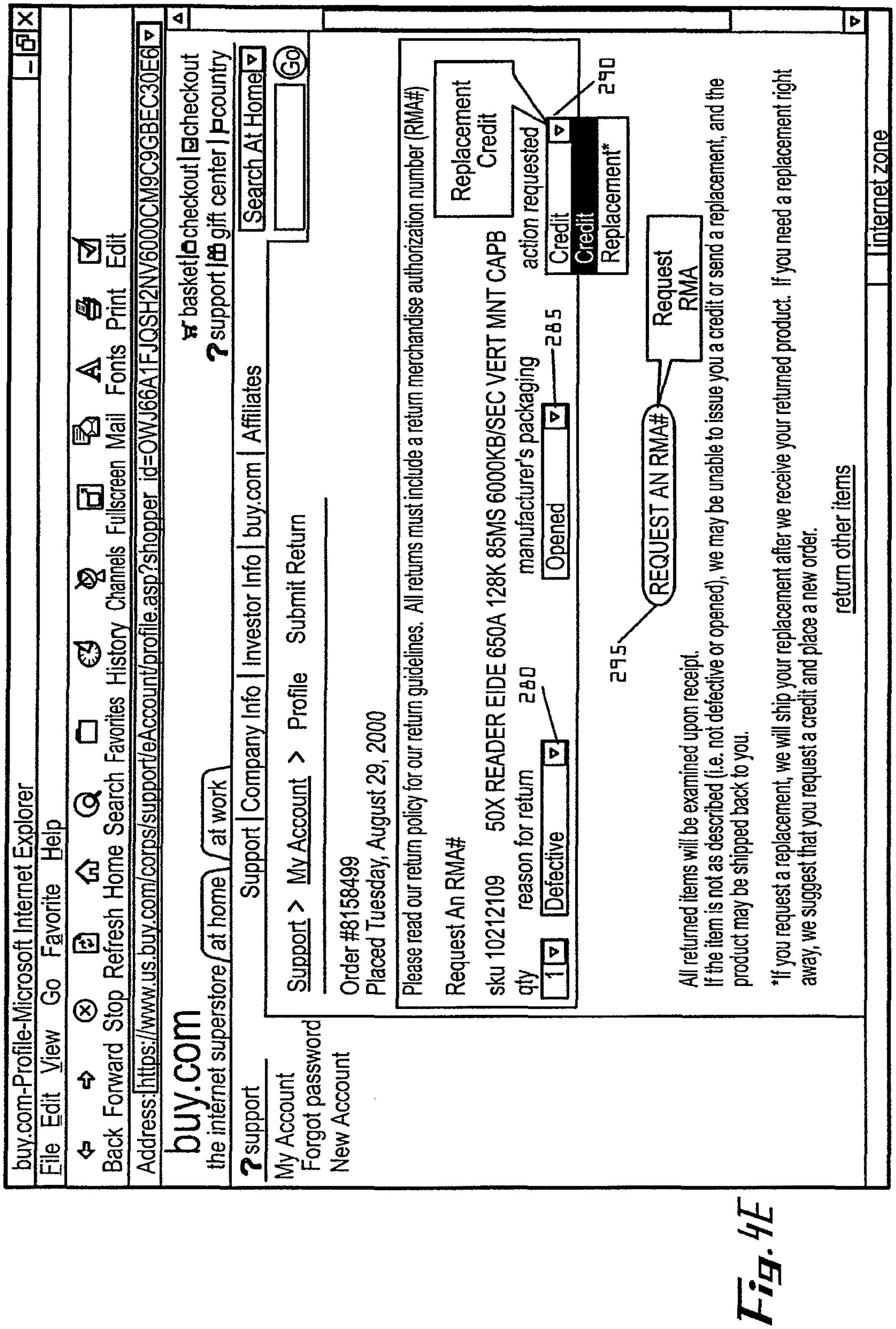

After checking the check box 270 associated with the 50× reader and clicking on the Returned Check Item(s) box 275, the customer 120 proceeds to FIG. 4C. With reference to FIGS. 4C-4E, the customer 120 is next prompted for information about the good being returned. This information may for example aid the merchant in determining whether to authorize the return and/or to determine whether the good should be returned to the merchant or to the vendor that supplied the good. In this example, the customer 120 is prompted to supply the reason for the return 280 (FIG. 4C), whether the package has been opened 285 (FIG. 4D) and whether the customer 120 seeks a credit or a replacement 290 (FIG. 4E). These steps are presented for illustrative purposes only and it should be readily apparent that different merchants will use different criteria to determine whether a good may be returned and under what conditions. Moreover, a merchant may use an automatic returns process like the one described herein or may alternatively review each return on an individual basis.

Figure 4F:
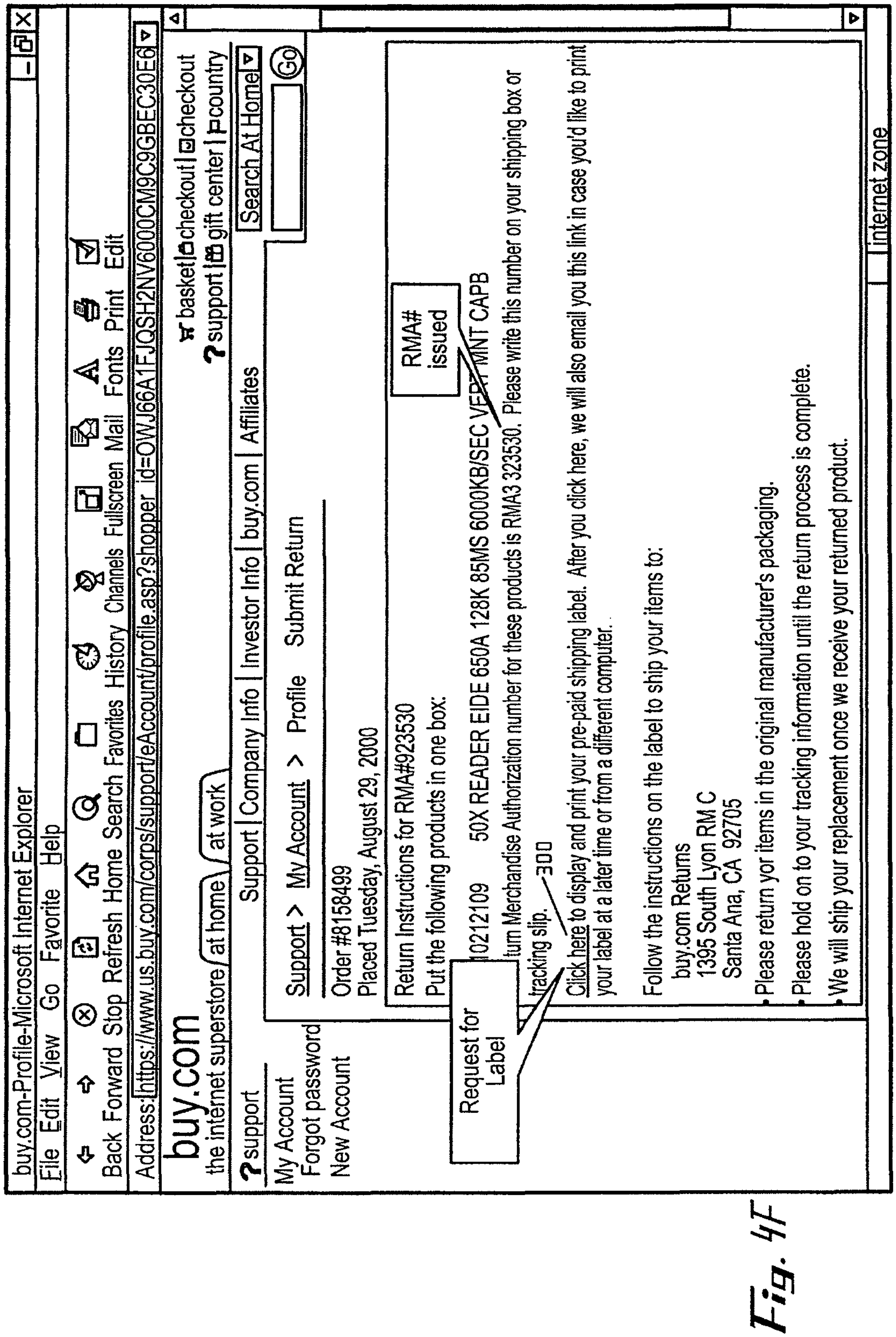

Upon entering the requested information, the customer 120 clicks the Request an RMA# button 295 and the process proceeds to FIG. 4F. In this example, the merchant has authorized the return and assigned a RMA number of 323530 to the 50× reader. In an alternative embodiment, the merchant does not authorize returns immediately and the customer 120 receives a web page with a message indicating that the return request will be processed. Once the merchant approves the return request and assigns a RMA number to the transaction, a shipping label link 300 is sent to the customer 120. In one embodiment, the merchant presents a shipping label in the customer browser. In a preferred embodiment, the merchant emails a label delivery link 300 to the customer 120 and the customer 120 presents the shipping label to the customer browser by activating the link. Additional embodiments and methods of presenting a shipping label to a customer are intended to be encompassed by the present invention, some of which are discussed more fully herein.

When the customer 120 clicks on the label delivery link 300, the customer's return request is sent from the merchant website to a merchant return application 115. In a preferred embodiment, the merchant return application 115 resides on the same server as the merchant website. But it will be readily apparent to one of ordinary skill in the art that a merchant return application may reside on a separate server or on a stand-alone device. The merchant return application 115 confirms that the customer 120 has provided the necessary returns information, validates the data provided and generates a return service request 305. The return service request 305 is then sent to the merchant server 110 where it is forwarded to the carrier server 140 via the common computer network 100.

In a preferred embodiment, the return service request 305 is formatted as an Extensible Markup Language (XML) file. XML is well known to one of ordinary skill in the art as an open standard for defining markup languages to represent structured information over the Internet. In general, XML describes a class of data objects called XML documents and partially describes the behavior of computer programs that process them. The use of XML in connection with the present invention is for illustrative purposes only and it will be readily apparent to one of ordinary skill in the art that the present invention may be implemented using other data formats.

FIGS. 5A and 5B show a typical XML return service request 305. In this non-limiting example, a return service request 305 includes access request information such as the merchant's access license number 310, userid 315 and password 320, label specification information 322 such as a print method 325, stock size 330, HTTP user agent 332, and image format 335, shipment information 337 such as shipper 340 (the merchant), destination or ship to 345 (the vendor) and origination or ship from 350 (the customer 120) data, return service 351, service 352, payment information 355 and package information 360. In a preferred embodiment, the package information 360 includes a vendor email address 365 and an undeliverable email address 370, both of which are discussed in greater detail below.

Returning to the embodiment of FIG. 3, in Step 210 the online return application 150 receives the return service request 305 created by the merchant return application 115 and transmitted by the merchant server 110. In a preferred embodiment, the online return application 150 resides on the carrier server 140. But it will be readily apparent to one of ordinary skill in the art that the online return application 115 may reside on a separate server or on a stand-alone device. Upon receipt, the online return application 150 verifies that the validity of the data stored in the return service request 305 and assigns a package tracking number 375 (as shown in FIG. 6 and FIG. 8B) to the return transaction. In a preferred embodiment, when a package tracking number 375 is assigned, the shipping information related to the return transaction is stored in a package tracking database. Later, when the package is shipped, the parties to the transaction can track the progress of the package through the carrier system using the package tracking number 375. In a preferred embodiment, the online return application 150 does not itself assign a package tracking number 375, but communicates with another carrier application that assigns package tracking numbers 375 and tracks packages shipped within the carrier system.

In Step 215, the online return application 150 forwards the return service request 305 to a label generation application 160. In a preferred embodiment, the online return application 150 sends the label generation application 160 only the shipping and label information that is required to generate a package label. The online return application 150 thus includes the additional functionality of extracting the shipping and label information from the return service request 305 and reformatting the information into a file that is inputted into the label generation application 160. The label generation application 160 may reside on the same server as the online return application 150 or may reside on another server or on a stand-alone device.

In Step 220, the label generation application 160 generates a return shipping label 400 from the shipping and label information, and transmits the return shipping label 400 back to the online return application 150. The process of generating a return shipping label 400 is well known to one of ordinary skill in the art and therefore, is not described in detail herein.

FIG. 6 illustrates a return shipping label 400 in accordance with an embodiment of the present invention. In this embodiment, the return shipping label 400 consists of two portions: a label area 405 and a text area 410. The label area 405 includes an origination shipping address 415, a destination shipping address 420, Maxicode™ 425, carrier service level 427, package weight 430, post office code 435, post office bar code 440, package tracking number 375, carrier bar code 450, billing code 455, merchandise description 460, service identification 465, and RMA number 470. The text area 410 includes instructions as to how to print and affix the label 475, shipping instructions 480, and a drop-off location link 485. In one embodiment, the drop-off location link 485 is a link that includes the zip code of the origination shipping address embedded in the URL address. When the link is activated, the user receives a web page that lists the carrier drop-off locations that are closest to the origination shipping address. Alternative embodiments of the return shipping label 400 are also well-known in the art and are encompassed by the present invention, and may include such additional features as packing instructions, advertisements or a link to a merchant or vendor web site. Additional links may be added to allow a customer to provide feedback or complaints.

Returning to FIG. 3, in Step 225 the online return application 150 transmits the return shipping label 400 to the merchant server 110 accompanied by a return service response 500. The return shipping label 400 may be transmitted as a GIF, EPL2, or PDF file or via other formats that are well known in the art for transmitting an image. In one embodiment, the return service response 500 is formatted as XML formatted data, but could readily be formatted using other formats known in the art. FIG. 7 illustrates a typical XML return service response 500 that a merchant might receive in Step 225. In this embodiment, the return service response 500 includes a response section 505 with fields for transaction reference 510 and response status code 515. The transaction reference 510 is a field for caller data. In a preferred embodiment, the transaction reference 510 allows the customer to add information to tie the response to the original return request. The response status code 515 notifies the merchant if an error occurred during the processing of the XML return service request. The XML return service response 500 also includes a shipment results section 520, a billing weight section 525, a shipment identification number 530 and a package tracking section 535. In one embodiment, the shipment identification number 530 is used to support multi-piece package shipments. In many cases, the package tracking number 375 will be used as the shipment identification number 530. In multi-piece shipments, the shipment identification number 530 is the package tracking number 375 of the first package.

Returning again to FIG. 3, in Step 230 the merchant provides the return shipping label 400 to the customer 120. In a preferred embodiment, the foregoing process of generating a return service request 305 and generating a return shipping label 400 is near instantaneous. Thus, an electronic image of the return shipping label 400 is delivered to the customer's browser in response to the customer's activation of the shipping link label 300 while the customer is still on the merchant website. Alternatively, the steps of generating and processing a return service request 305 may not be instantaneous and the merchant may provide the customer 120 with an electronic image of a return shipping label 400 at a later time. Delivery of the return shipping label 400 from the merchant to the customer 120 can occur via email, the postal system or by other methods discussed herein. In one embodiment, the merchant or the carrier may store the electronic image of the return shipping label 400 on one of the merchant server 110 and carrier server 140 and the merchant will send an email to the customer 120 that contains a link to the label image. Alternatively, a return shipping label 400 may be printed by a carrier and hand-delivered by a driver to the customer 120. Additional methods of providing an electronic image of a return shipping label 400 to a customer 120 exist are known in the art and are intended to be encompassed by the present invention.

In Step 235, the online return application 150 sends an electronic return notification 550 to the vendor server 130 indicating that a return service request 305 has been processed and that a customer 120 intends to ship a returned good to the vendor. In a preferred embodiment, an electronic return notification 550 is generated for every return service request 305 processed by the online return application 150. In an alternative embodiment, an electronic return notification 550 is automatically generated whenever the destination shipping address 420 is different from the merchant's shipping address. In still another embodiment, an electronic return notification is generated whenever the merchant includes a vendor email address 365 in the return service request 305.

FIGS. 8A and 8B illustrate an electronic return notification 550 in accordance with an embodiment of the present invention. In this embodiment, the electronic return notification 550 consists of two portions: a human-readable area 555 (FIG. 8A) and a machine-readable area 560 (FIG. 8B). The human-readable area 555 includes an origination shipping address 415, destination shipping address 420, package tracking number 375, merchandise description 460, UPS service level 427, package weight 430 and RMA number 470. In this manner, the human-readable area 555 of the electronic return notification 550 provides returns transaction information to vendors that rely on individuals rather than machines to track incoming packages and returns.

FIG. 8B illustrates the machine-readable area 560 of an electronic return notification 550 in accordance with an embodiment of the present invention. In this embodiment, the machine-readable area 560 is formatted as an XML document, but it will be readily apparent to one of ordinary skill in the art that other data formats exist and may be used with the present invention. The machine-readable area 560 also contains the returns transaction information, but allows a vendor with an automated shipping system to process the electronic return notification 550 without requiring a manual review of the email text. In a preferred embodiment, the machine-readable area 560 includes shipper information 340, an origination shipping address 415, a destination shipping address 420, a merchandise description 460, package weight 430, package tracking number 375 and RMA number 470. Also in a preferred embodiment, the machine-readable area 560 is appended to the human-readable area 555 and comprises an electronic mail. But it will be readily apparent that either or both sections of the electronic return notification 550 can be transmitted separately and by means other than email. Thus, in an illustrative alternate embodiment, in Step 235 a vendor might receive a facsimile of just the human-readable area 555 of the electronic return notification 550.

FIG. 9 is a high-level diagram that illustrates a second method by which an online return application 150 processes a return request. The process starts in Step 700 with a customer 120 contacting a merchant and notifying the merchant that the customer wishes to return a good that the customer 120 previously purchased. This notification may or may not occur electronically but in a preferred embodiment occurs via a merchant web site that resides on the merchant server 110.

In Step 705, the merchant return application 115 processes the return request and generates a return service request 305, which is transmitted to the label generation application 160. In a preferred embodiment, the return service request 305 is formatted as an XML document but other formats are known in the art and may be used with the present invention. Upon receipt of the return service request 305, the online return application 150 verifies the validity of the transmitted data and assigns a package tracking number 375 to the return request. In an alternative embodiment, the online return application 150 does not itself assign a package tracking number 375 to the return transaction, but communicates with another carrier application that assigns package tracking numbers and tracks packages shipped within the carrier system.

In Step 710, the online return application 150 forwards the return service request 305 to a label generation application 160. In an alternative embodiment, the online return application 160 extracts the shipping and package label information from the return service request 305 and reformats the information before it is sent to the label generation application 160.

In Step 715, the label generation application 160 generates a return shipping label 400 from the shipping and package label information, and transmits the return shipping label 400 back to the online return application 150.

In Step 720, the online return application 150 sends a return service confirmation 600 to the merchant server 140. In a preferred embodiment the return service confirmation 600 is formatted as an XML document, but it will be readily apparent to one of ordinary skill in the art that other data formats exist and may be used with the present invention. In one embodiment, the information contained in the return service confirmation 600 is the same as that in the electronic return verification 550 (see FIG. 8*b*). In alternative embodiments, the return service confirmation 600 may include a link to the return shipping label 400 or an encoded label delivery link 625 (discussed below).

In Step 725, the online return application 150 sends an electronic return notification 550 to the vendor server 130 indicating that a return service request 305 has been processed and that a customer 120 intends to ship a returned good to the vendor. In a preferred embodiment, the electronic return notification 550 has a machine-readable area 560 appended to the human-readable area 555 to allow automatic input into a vendor shipping system without the need for human intervention. In alternative embodiments, the returned good is shipped directly to the merchant and no electronic return notification 550 is generated as no vendor is involved. Alternatively, only the machine-readable area 560 of the electronic return notification 550 is supplied to the vendor.

In Step 730, the online return application 150 generates and sends a return shipping email 630 to the customer 120. In one embodiment, the return shipping email 630 includes a link to an image file of a return shipping label 400. The return shipping email 630 can also include an encoded label delivery link 625. In a preferred embodiment, the online return application 150 generates the encoded label delivery link 625, which is a hypertext link to a uniform resource locator (URL) with additional information appended that identifies the return shipping label 400 generated for the return service request 305. In a preferred embodiment of the delivery link 625 includes a link to a URL. But it will be readily apparent that the delivery link 625 may include any encoded or encrypted string of characters which will cause the online return application or other application in the return services system to respond with an image of the desired shipping label. Moreover, the shipping label delivered to the customer browser may be returned from a storage location or generated dynamically at the time of activation of the link 625.

In a preferred embodiment, the label delivery link 625 when activated links to the URL of a label generation servlet 650. Servlets are well known in the art as Java applications that run in a web server or application server and provide server-side processing. Because they are written in Java, servlets are portable between servers and operating systems. The servlet programming interface (Java Servlet API) is a standard part of the Java 2 platform, enterprise edition (J2EE). If a Web server, such as Microsoft's Internet Information Server (IIS), does not run servlets natively, a third-party servlet plug-in can be installed to add the runtime support.

The use of a Java servlet in this embodiment is for illustrative purposes only. One of ordinary skill in the art will readily recognize that there are many methods of invoking the dynamic generation or recovery of the shipping label. For example, the target of the URL could be an application written in C, C++, or any other computer language invoked through a common gateway interface or via other means.

In an alternative embodiment, the label delivery link 625 when activated links to the URL of the online generation application 150, which establishes the link to a label generation servlet 650.

In a preferred embodiment, the information appended to the URL in the label delivery link 625 to identify a return shipping label 400 includes a package tracking number 375, a locality string 635, a merchant registration identification 640 and, optionally, a return shipping label creation date 630. Because this information identifies a return shipping label 400 it contains potentially sensitive shipping information; therefore, in a preferred embodiment, the information is encrypted to prevent unauthorized access as the return shipping email 630 passes through a computer network 100 such as the Internet. In the preferred embodiment, the information string appended to the label delivery link 625 is encrypted using triple data encryption standard (DES) techniques and is encoded.

In Step 735, the customer 120 receives the return service email 800 and activates the label generation servlet 650 by clicking on the label delivery link 625. The foregoing steps of processing a return service request 305 may be near instantaneous, or there may be a delay between the customer's request to make a return and the transmittal of a return service email 800 containing a label delivery link 625. Upon activation of the label delivery link 625, the information string is decoded and decrypted. In one embodiment, the online return application 150 receives the information string and performs the decoding and decryption processes. In an alternative embodiment, the label generation servlet 650 performs the decoding and decryption processes.

The online return application 150 extracts the package tracking number 375 and merchant registration identification 640 from the decrypted and decoded information string. This information is then compared against a return label database 670 to retrieve the shipping information that is necessary to regenerate the requested return shipping label 400. In one embodiment, a new record is added to the return label database 670 every time that a return shipping label 400 is generated. In another embodiment, the return label database 670 is populated only when a customer 120, merchant or vendor has requested that a return shipping label 400 be saved for possible recovery and/or regeneration. In yet another embodiment, the shipping information stored on the return label database 670 is kept for a finite period and is erased or migrated after the expiration of a predetermined period or occurrence of a predetermined condition.

In Step 740, the online return application 150 generates a return shipping label 400 using the shipping information obtained from the return label database 670 and transmits the return shipping label 400 to the customer 120. In one embodiment, a copy of the return shipping label 400 associated with the decoded and decrypted package tracking number 375 and merchant registration identification 640 is stored on the return label database 670. In another embodiment, a copy of the return shipping label 400 is not stored on the return label database 670 and the online return application 150 sends the associated shipping information to the label generation application 160 to have the return shipping label 400 generated.

In one embodiment, a return shipping label 400 and/or the shipping information necessary to regenerate a return shipping label 400 is indexed by the package tracking number 375 and merchant registration identification 640. In an effort to obtain additional security, an alternative embodiment may also require a return shipping label creation date 630 to regenerate a return shipping label 400. In such an embodiment, the return shipping label creation date 630 may be included in the encrypted and encoded information string transmitted to the online return application 150 upon activation of the label delivery link 625. Label recovery is also available in the present invention. Label recovery exists to cover the contingency of a customer being unable to print a label. In such case, the merchant has the ability to transmit a label recovery request to the online return application and receive another copy of the return shipping label generated for the original return service request. For example, upon receipt of a recovery request, another copy of the electronic image of a return shipping label may be provided to the merchant or, alternatively, the label delivery link associated with the original return request may be regenerated and re-transmitted.

FIG. 10 is a high-level diagram that illustrates a second method by which an online return application 150 processes a return request. The process starts in Step 800 with a customer 120 contacting a merchant and notifying the merchant that the customer wishes to return a good that the customer 120 previously purchased. This notification may or may not occur electronically but in a preferred embodiment occurs via a merchant web site that resides on the merchant server 110.

In Step 805, the merchant application 115 processes the return request and generates a return service request 305, which is transmitted to the label generation application 150. In a preferred embodiment, the return service request 305 is formatted as an XML document but other formats are known in the art and may be used with the present invention. Upon receipt of the return service request 305, the online return application 150 verifies the validity of the transmitted data and assigns a package tracking number 375 to the return request. In an alternative embodiment, the online return application 150 does not itself assign a package tracking number 375 to the return transaction, but communicates with another carrier application that assigns package tracking numbers and tracks packages shipped within the carrier system. In Step 810, the online return application 150 forwards the return service request 305 to a label generation application 160. Alternatively, the online return application 150 does not send the return service request 305 to the label generation application 160 and instead extracts and sends just that shipping and package label information that is required to generate a return shipping label 400. In Step 815, the label generation application 160 generates a return shipping label 400 from the shipping and package label information, and transmits the return shipping label 400 back to the online return application 150.

In Step 820, the online return application 150 sends a return service confirmation 600 to the merchant server 140. In a preferred embodiment the return service confirmation 700 is formatted as an XML document, but it will be readily apparent to one of ordinary skill in the art that other data formats exist and may be used with the present invention. Also, in a preferred embodiment, the return service confirmation 600 includes an image file for the return shipping label 400. In alternative embodiments, the return service confirmation 600 includes a link to the return shipping label 400 or, if security is a necessary or desired, to an encoded label delivery link 625.

In Step 825, the online return application 150 sends an electronic return notification 550 to the vendor server 130 indicating that a return service request 305 has been processed and that a customer 120 intends to ship a returned good to the vendor. In a preferred embodiment, the electronic return notification 550 has a machine-readable area 560 appended to the human-readable area 560 to allow automatic input into a vendor shipping system without the need for human intervention. In alternative embodiments, the returned good is shipped directly to the merchant and no electronic return notification 550 is generated as no vendor is involved.

In Step 830, the online return application 150 accesses a carrier facility database 690 using the origination shipping address 415 to determine which local carrier facility 695 is responsible for deliveries to and from the customer's address. The carrier facility database in a preferred embodiment resides on a carrier server 140, but it will be readily apparent that carrier facility information can be stored on a wide variety of computers and/or other electronic devices known in the art. In a preferred embodiment, the online return application 150 then transmits an image of the return shipping label 400 to a printer located at the local carrier facility 695 where the return shipping label 400 is printed. In an alternative embodiment, the online return application sends the return shipping label 400 to a computer or server at the local carrier facility 695 where an operator prints the return shipping label 400.

In Step 835, a driver from the local carrier facility 695 picks up the return shipping label 400 and takes it to the origination shipping address 415, which in a preferred embodiment is the customer's address. The driver then picks up the good that is being returned from the customer 120, affixes the return shipping label 400 to the package and places it in the carrier shipping system where it is ultimately delivered to the destination shipping address 420.

If the customer 120 is not home when the driver attempts to pick up the package, the driver may leave the return shipping label 400 for the customer 120 or may attempt to pick up the package at a later date. In a preferred embodiment, the carrier service level 427 determines which action a driver takes if the customer 120 is not home for the pick up attempt. In one embodiment, a carrier offers a single attempt service in which the driver makes one attempt to pick up the package. In the single attempt service, the driver leaves the return shipping label 400 at the customer's residence if the customer 120 is not home when the pick up attempt is made. The customer 120 thus is required to affix the return shipping label 400 to the package and place the package in the carrier shipping system by delivering it to a carrier drop-off location. In alternative embodiments, other carrier service levels 427 are available in which the driver will return on multiple occasions to try to pick up the package. In the preferred embodiment, a carrier offers single attempt and three attempt carrier service levels 427 though other levels of service can be offered in accordance with the present invention.

Another aspect of the present invention is a system and method for handling undelivered email. Invalid email addresses are a recurring problem in any system that relies upon communication through email and the problems are exacerbated in automated systems due to the lack of human involvement. In many cases, an invalid email address is a result of a simple typographical error, but invalid addresses can occur from outdated Internet accounts or any of a host of other reasons that are well known in the art.

In the present invention, communication between the customer 120, merchant server 110, carrier server 140 and vendor server can occur via email. For example, in a preferred embodiment a carrier relies upon the vendor email address 365 provided by the merchant in the return service request 305 to transmit an electronic return notification 550 to the vendor server 130. If the vendor email address 365 provided by the merchant is invalid or otherwise undeliverable, there is a possibility that the vendor server 130 will not receive the electronic return notification 550. At a minimum, human intervention by the carrier and/or the merchant may be required to address the problem.

FIG. 11 is a high-level block diagram of a method of handling undeliverable emails in accordance with an embodiment of the present invention. In Step 900, the online return application 150 receives a return service request 305 from a merchant that includes a vendor email address 365. In a preferred embodiment, the return service request 305 also includes a bounce email address 370. The bounce email address 370 may be the merchant's email address, the vendor's email address or a customer service or other email address of a person or persons that are prepared to handle undelivered emails.

In Step 910, the bounce email address (e.g., merchant email address) will be validated and verified before generating an electronic return notification 550. In Step 920, the online return application 150 generates and sends an electronic return notification 550. In a preferred embodiment, the electronic return notification 550 includes an encrypted XML document attached to the email that includes the bounce email address 370. In a preferred embodiment, the XML document is encrypted using triple data encryption standard (DES) techniques, but other encryption techniques are well known in the art and can be used with the present invention.

In Step 930, the online return application 150 determines whether the electronic return notification 550 is delivered to the customer successfully. If the electronic return notification 550 is delivered, the process ends at Step 950. If the electronic return notification 550 is returned as undeliverable (Step 940), the online return application 150 retrieves the XML attachment from the undelivered email and forwards the electronic return notification 550 to the bounce email address 370. The online return application 150 forwards the undelivered email to the merchant server 110 under the assumption that the merchant or other entity associated with the bounce email address 370 is equipped to address the issue that caused the electronic return notification 550 not to be delivered. One of ordinary skill in the art will readily recognize that the undelivered email may also be forwarded to a customer 120, a merchant return application 115 or to any other person or entity that has a valid email address.

The electronic return system 10, which comprises an ordered listing of selectable services can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Further, any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

It should be emphasized that the above-described embodiments of the present invention, particularly any "preferred embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention and protected by the following claims.

In concluding the detailed description, it should be noted that it will be obvious to those skilled in the art that many variations and modifications can be made to the preferred embodiment without substantially departing from the principles of the present invention. Also, such variations and modifications are intended to be included herein within the scope of the present invention as set forth in the appended claims. Further, in the claims hereafter, the structures, materials, acts and equivalents of all means or step-plus function elements are intended to include any structure, materials or acts for performing their cited functions.

That which is claimed:

1. An electronic return shipping system, comprising:

one or more computers and a network wherein said one or more computers are configured to:

receive a return service request to return a good previously purchased by a customer from a merchant;

generate a shipping label based at least in part on said return service request, wherein the shipping label includes a package tracking number; and format and send a label delivery link that is associated with said shipping label and includes a hypertext link to a uniform locator address.

2. The system of claim 1, wherein said one or more computers are configured to generate said return service request as an extensible markup language document.

3. The system of claim 1, wherein said one or more computers are configured to obtain a package tracking number for said return service request and include said package tracking number on said shipping label.

4. The system of claim 1, wherein said one or more computers are configured to send said label delivery link to said merchant via electronic mail.

5. The system of claim 1, wherein said one or more computers are configured to send said label delivery link to said customer via electronic mail.

6. The system of claim 1, wherein said uniform locator address of said label delivery link and said one or more computers are configured to deliver said shipping label to a browser associated with said customer upon activation of said label delivery link.

7. The system of claim 1, wherein said label delivery link includes at least one of a locality string, a merchant registration identification and a shipping label creation date.

8. The system of claim 1, wherein said one or more computers are configured to encrypt at least a portion of said label delivery link.

9. The system of claim 1, wherein said one or more computers are configured to encode at least a portion of said label delivery link.

10. The system of claim 1, wherein said one or more computers are configured to generate an electronic return notification.

11. The system of claim 10, wherein said electronic return notification comprises a human-readable portion and a machine-readable portion.

12. The system of claim 11, wherein said one or more computers are configured to send said electronic return notification to said merchant via an electronic mail.

13. The system of claim 11, wherein said one or more computers are configured to send said electronic return notification to a vendor that supplied the merchant with said good to be returned.

14. The system of claim 13, wherein one or more computers are configured to add a vendor email address and a bounce email address to said electronic mail, and wherein said online return application is further configured to forward said electronic mail to said bounce email address upon receipt of a notification that said electronic mail could not be delivered to said vendor email address.

15. The system of claim 14, wherein said bounce email address is an address associated with said merchant.

16. An electronic return shipping system, comprising:

one or more computers and a network wherein said one or more computers are configured to:

receive a return service request to return a good previously purchased by a first entity from a second entity;

generate a shipping label based at least in part on said return service request, wherein the shipping label includes a package tracking number; and format and send a label delivery link that is associated with said shipping label and includes a hypertext link to a uniform locator address.

17. A non-transitory computer-readable medium having computer-readable code embodied in said medium, said computer-readable code comprising:

receiving a return service request from a merchant application over a computer network generated by said merchant application in response to a request from a customer to return a good previously purchased from a merchant;

generating a shipping label based at least in part on said return service request, wherein the shipping label includes a package tracking number; and formatting and sending a label delivery link that is associated with said shipping label and includes a hypertext link to a uniform locator address.

* * * * *